US010652444B2

(12) United States Patent
Horstmeyer et al.

(10) Patent No.: US 10,652,444 B2
(45) Date of Patent: *May 12, 2020

(54) MULTIPLEXED FOURIER PTYCHOGRAPHY IMAGING SYSTEMS AND METHODS

(71) Applicant: California Institute of Technology, Pasadena, CA (US)

(72) Inventors: Roarke W. Horstmeyer, San Marino, CA (US); Guoan Zheng, Vernon, CT (US); Changhuei Yang, Alhambra, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,252

(22) Filed: Dec. 4, 2015

(65) Prior Publication Data

US 2016/0088205 A1 Mar. 24, 2016

Related U.S. Application Data

(63) Continuation-in-part of application No. 14/065,280, filed on Oct. 28, 2013.
(Continued)

(51) Int. Cl.
G02B 21/00 (2006.01)
H04N 5/225 (2006.01)
(Continued)

(52) U.S. Cl.
CPC ......... H04N 5/2256 (2013.01); G02B 21/365 (2013.01); G02B 21/367 (2013.01);
(Continued)

(58) Field of Classification Search
CPC ........... G01N 27/44721; G01N 21/474; G02B 21/00; G02B 21/06
(Continued)

(56) References Cited

U.S. PATENT DOCUMENTS 5,475,527 A 12/1995 Hackel et al.
6,144,365 A 11/2000 Young et al.
(Continued)

FOREIGN PATENT DOCUMENTS

CN 1688254 A 10/2005
CN 1932565 A 3/2007
(Continued)

OTHER PUBLICATIONS

Tian, "Multiplexed coded illumination for Fourier Ptychography with an LED array microscope" (Year: 2014).*
(Continued)

Primary Examiner — Albert Kir
(74) Attorney, Agent, or Firm — Sheila Martinez-Lemke; Weaver Austin Villeneuve & Sampson LLP

(57) ABSTRACT

Certain embodiments pertain to Multiplexed Fourier Ptychographic imaging systems and methods. In one example, the Multiplexed Fourier Ptychographic imaging system includes an LED array configured to illuminate a sequence of LED patterns for illuminating a sample being imaged. The system includes LED circuitry configured to independently control power to turn on multiple LEDs simultaneously in each LED pattern of the array. The system has a light detector that acquires a first set of lower resolution images of the sample each image acquired during exposure time during illumination by a unique LED pattern. The system uses the first set of lower resolution images to generate a second set of lower resolution images associated with each LED in the LED array and iteratively updates overlapping regions in the Fourier domain with the second set of lower resolution images to generate a higher resolution image.

18 Claims, 12 Drawing Sheets

Related U.S. Application Data

(60) Provisional application No. 61/720,258, filed on Oct. 30, 2012, provisional application No. 61/847,472, filed on Jul. 17, 2013, provisional application No. 62/087,633, filed on Dec. 4, 2014.

(51) Int. Cl.
| | |
|---|---|
| *H04N 5/232* | (2006.01) |
| *H04N 5/265* | (2006.01) |
| *G02B 27/58* | (2006.01) |
| *G06K 9/00* | (2006.01) |
| *G02B 21/36* | (2006.01) |
| *G21K 7/00* | (2006.01) |

(52) U.S. Cl.
CPC ......... *G02B 27/58* (2013.01); *G06K 9/00134* (2013.01); *H04N 5/23229* (2013.01); *H04N 5/265* (2013.01); *G02B 21/002* (2013.01); *G21K 7/00* (2013.01)

(58) Field of Classification Search
USPC ....... 356/445; 359/385; 204/452; 250/208.1; 348/80
See application file for complete search history.

(56) References Cited

U.S. PATENT DOCUMENTS

| | | | |
|---|---|---|---|
| 6,154,196 A | 11/2000 | Fleck et al. | |
| 6,320,174 B1 | 11/2001 | Tafas et al. | |
| 6,320,648 B1 | 11/2001 | Brueck et al. | |
| 6,747,781 B2 | 6/2004 | Trisnadi | |
| 6,759,949 B2 | 7/2004 | Miyahara | |
| 6,905,838 B1 | 6/2005 | Bittner | |
| 7,436,503 B1 | 10/2008 | Chen et al. | |
| 7,460,248 B2 | 12/2008 | Kurtz et al. | |
| 7,706,419 B2 | 4/2010 | Wang et al. | |
| 7,738,095 B2 | 6/2010 | Gardner, Jr. et al. | |
| 7,787,588 B1 | 8/2010 | Yun et al. | |
| 8,271,251 B2 | 9/2012 | Schwartz et al. | |
| 8,313,031 B2 | 11/2012 | Vinogradov | |
| 8,497,934 B2 | 7/2013 | Milnes et al. | |
| 8,624,968 B1 | 1/2014 | Zheng et al. | |
| 8,654,201 B2 | 2/2014 | Lim et al. | |
| 8,942,449 B2 | 1/2015 | Maiden | |
| 9,029,745 B2 | 5/2015 | Maiden | |
| 9,426,455 B2 | 8/2016 | Horstmeyer et al. | |
| 9,497,379 B2 | 11/2016 | Ou et al. | |
| 9,829,695 B2 | 11/2017 | Kim et al. | |
| 9,864,184 B2 | 1/2018 | Ou et al. | |
| 9,892,812 B2 | 2/2018 | Zheng et al. | |
| 9,983,397 B2 | 5/2018 | Horstmeyer et al. | |
| 9,993,149 B2 | 6/2018 | Chung et al. | |
| 9,998,658 B2 | 6/2018 | Ou et al. | |
| 10,162,161 B2 | 12/2018 | Horstmeyer et al. | |
| 10,168,525 B2 | 1/2019 | Kim et al. | |
| 10,222,605 B2 | 3/2019 | Kim et al. | |
| 10,228,550 B2 | 3/2019 | Ou et al. | |
| 10,401,609 B2 | 9/2019 | Ou et al. | |
| 10,419,665 B2 | 9/2019 | Ou et al. | |
| 10,568,507 B2 | 2/2020 | Chung et al. | |
| 2001/0055062 A1 | 12/2001 | Shioda et al. | |
| 2002/0141051 A1 | 10/2002 | Vogt et al. | |
| 2003/0116436 A1* | 6/2003 | Amirkhanian ... | G01N 27/44721 204/452 |
| 2003/0118223 A1 | 6/2003 | Rahn et al. | |
| 2004/0057094 A1 | 3/2004 | Olszak et al. | |
| 2004/0146196 A1 | 7/2004 | Van Heel | |
| 2004/0190762 A1 | 9/2004 | Dowski, Jr. et al. | |
| 2005/0211912 A1 | 9/2005 | Fox | |
| 2006/0098293 A1 | 5/2006 | Garoutte et al. | |
| 2006/0158754 A1 | 7/2006 | Tsukagoshi et al. | |
| 2006/0173313 A1 | 8/2006 | Liu et al. | |
| 2006/0291707 A1 | 12/2006 | Kothapalli et al. | |
| 2007/0057184 A1 | 3/2007 | Uto et al. | |
| 2007/0133113 A1 | 6/2007 | Minabe et al. | |
| 2007/0159639 A1 | 7/2007 | Teramura et al. | |
| 2007/0171430 A1 | 7/2007 | Tearney et al. | |
| 2007/0189436 A1 | 8/2007 | Goto et al. | |
| 2007/0206200 A1 | 9/2007 | Lindner et al. | |
| 2007/0269826 A1 | 11/2007 | Geddes | |
| 2008/0101664 A1 | 5/2008 | Perez | |
| 2008/0182336 A1 | 7/2008 | Zhuang et al. | |
| 2009/0046164 A1 | 2/2009 | Shroff et al. | |
| 2009/0079987 A1* | 3/2009 | Ben-Ezra ............ | G01N 21/474 356/445 |
| 2009/0125242 A1 | 5/2009 | Choi et al. | |
| 2009/0284831 A1 | 11/2009 | Schuster et al. | |
| 2009/0316141 A1 | 12/2009 | Feldkhun | |
| 2010/0135547 A1 | 6/2010 | Lee et al. | |
| 2010/0271705 A1 | 10/2010 | Hung | |
| 2011/0075928 A1 | 3/2011 | Jeong et al. | |
| 2011/0181869 A1 | 7/2011 | Yamaguchi et al. | |
| 2011/0192976 A1 | 8/2011 | Own et al. | |
| 2011/0235863 A1 | 9/2011 | Maiden | |
| 2011/0255163 A1 | 10/2011 | Merrill et al. | |
| 2012/0069344 A1 | 3/2012 | Liu | |
| 2012/0099803 A1 | 4/2012 | Ozcan et al. | |
| 2012/0105618 A1 | 5/2012 | Brueck et al. | |
| 2012/0118967 A1 | 5/2012 | Gerst | |
| 2012/0157160 A1 | 6/2012 | Ozcan et al. | |
| 2012/0176673 A1 | 7/2012 | Cooper | |
| 2012/0182541 A1 | 7/2012 | Canham | |
| 2012/0218379 A1 | 8/2012 | Ozcan et al. | |
| 2012/0248292 A1* | 10/2012 | Ozcan .................... | G02B 21/00 250/208.1 |
| 2012/0250032 A1 | 10/2012 | Wilde et al. | |
| 2012/0281929 A1 | 11/2012 | Brand et al. | |
| 2013/0057748 A1 | 3/2013 | Duparre et al. | |
| 2013/0083886 A1 | 4/2013 | Carmi et al. | |
| 2013/0093871 A1 | 4/2013 | Nowatzyk et al. | |
| 2013/0094077 A1* | 4/2013 | Brueck ................. | G02B 21/06 359/385 |
| 2013/0100525 A1 | 4/2013 | Chiang et al. | |
| 2013/0170767 A1 | 7/2013 | Choudhury et al. | |
| 2013/0182096 A1 | 7/2013 | Boccara et al. | |
| 2013/0223685 A1 | 8/2013 | Maiden | |
| 2014/0007307 A1 | 1/2014 | Routh, Jr. et al. | |
| 2014/0029824 A1 | 1/2014 | Shi et al. | |
| 2014/0043616 A1 | 2/2014 | Maiden et al. | |
| 2014/0050382 A1 | 2/2014 | Adie et al. | |
| 2014/0085629 A1 | 3/2014 | Bodkin et al. | |
| 2014/0118529 A1 | 5/2014 | Zheng et al. | |
| 2014/0126691 A1 | 5/2014 | Zheng et al. | |
| 2014/0133702 A1 | 5/2014 | Zheng et al. | |
| 2014/0152801 A1 | 6/2014 | Fine et al. | |
| 2014/0153692 A1 | 6/2014 | Larkin et al. | |
| 2014/0160236 A1 | 6/2014 | Ozcan et al. | |
| 2014/0160488 A1 | 6/2014 | Zhou | |
| 2014/0217268 A1 | 8/2014 | Schleipen et al. | |
| 2014/0267674 A1 | 9/2014 | Mertz et al. | |
| 2014/0347672 A1 | 11/2014 | Pavillon et al. | |
| 2014/0368812 A1 | 12/2014 | Humphry et al. | |
| 2015/0036038 A1 | 2/2015 | Horstmeyer et al. | |
| 2015/0044098 A1 | 2/2015 | Smart et al. | |
| 2015/0054979 A1 | 2/2015 | Ou et al. | |
| 2015/0160450 A1 | 6/2015 | Ou et al. | |
| 2015/0264250 A1 | 9/2015 | Ou et al. | |
| 2015/0286042 A1 | 10/2015 | Hilbert et al. | |
| 2015/0331228 A1 | 11/2015 | Horstmeyer et al. | |
| 2016/0110584 A1 | 4/2016 | Remiszewski et al. | |
| 2016/0156880 A1 | 6/2016 | Teich et al. | |
| 2016/0178883 A1 | 6/2016 | Horstmeyer et al. | |
| 2016/0202460 A1 | 7/2016 | Zheng | |
| 2016/0210763 A1 | 7/2016 | Horstmeyer et al. | |
| 2016/0216208 A1 | 7/2016 | Kim et al. | |
| 2016/0216503 A1 | 7/2016 | Kim et al. | |
| 2016/0266366 A1 | 9/2016 | Chung et al. | |
| 2016/0320595 A1 | 11/2016 | Horstmeyer et al. | |
| 2016/0320605 A1 | 11/2016 | Ou et al. | |
| 2016/0341945 A1 | 11/2016 | Ou et al. | |
| 2017/0061599 A1 | 3/2017 | Remiszewski et al. | |
| 2017/0146788 A1 | 5/2017 | Waller et al. | |

(56) References Cited

U.S. PATENT DOCUMENTS

| | | |
|---|---|---|
| 2017/0178317 A1 | 6/2017 | Besley et al. |
| 2017/0188853 A1 | 7/2017 | Nakao et al. |
| 2017/0273551 A1 | 9/2017 | Chung et al. |
| 2017/0299854 A1 | 10/2017 | Kim et al. |
| 2017/0354329 A1 | 12/2017 | Chung et al. |
| 2017/0363853 A1 | 12/2017 | Besley |
| 2017/0371141 A1 | 12/2017 | Besley |
| 2018/0045569 A1 | 2/2018 | Nath et al. |
| 2018/0048811 A1 | 2/2018 | Waller et al. |
| 2018/0078447 A1 | 3/2018 | Viner et al. |
| 2018/0078448 A9 | 3/2018 | Shockley, Jr. et al. |
| 2018/0088309 A1 | 3/2018 | Ou et al. |
| 2018/0120553 A1 | 5/2018 | Leshem et al. |
| 2018/0231761 A1 | 8/2018 | Dai et al. |
| 2018/0307017 A1 | 10/2018 | Horstmeyer et al. |
| 2018/0316855 A1 | 11/2018 | Ou et al. |
| 2018/0329194 A1 | 11/2018 | Small et al. |
| 2018/0348500 A1 | 12/2018 | Naaman, III et al. |
| 2018/0373016 A1 | 12/2018 | Leshem et al. |
| 2019/0049712 A1 | 2/2019 | Kim et al. |
| 2019/0056578 A1 | 2/2019 | Horstmeyer et al. |
| 2019/0077610 A1 | 3/2019 | Flammann |
| 2019/0097523 A1 | 3/2019 | Schaefer |
| 2019/0097524 A1 | 3/2019 | Lin |
| 2019/0137753 A1 | 5/2019 | Chan et al. |
| 2019/0317311 A1 | 10/2019 | Kim et al. |
| 2019/0331902 A1 | 10/2019 | Ou et al. |
| 2019/0391382 A1 | 12/2019 | Chung et al. |

FOREIGN PATENT DOCUMENTS

| | | |
|---|---|---|
| CN | 1311392 C | 4/2007 |
| CN | 101408623 A | 4/2009 |
| CN | 101680848 A | 3/2010 |
| CN | 101743519 A | 6/2010 |
| CN | 101868740 A | 10/2010 |
| CN | 101872033 A | 10/2010 |
| CN | 101957183 A | 1/2011 |
| CN | 102608597 A | 7/2012 |
| CN | 102753935 A | 10/2012 |
| CN | 103096804 A | 5/2013 |
| CN | 103154662 A | 6/2013 |
| CN | 103201648 A | 7/2013 |
| CN | 103377746 A | 10/2013 |
| CN | 104181686 A | 12/2014 |
| CN | 104200449 A | 12/2014 |
| JP | 2007-299604 A | 11/2007 |
| JP | 2008-147629 A | 6/2008 |
| JP | 2010-012222 A | 1/2010 |
| KR | 10-1998-0075050 A | 11/1998 |
| TW | 201428339 A | 7/2014 |
| WO | WO 99/53469 A1 | 10/1999 |
| WO | WO 2002/102128 A1 | 12/2002 |
| WO | WO 2003/062744 A1 | 7/2003 |
| WO | WO 2008/116070 A1 | 9/2008 |
| WO | WO 2011/093043 A1 | 8/2011 |
| WO | WO 2012/037182 A1 | 3/2012 |
| WO | WO 2014/070656 A1 | 5/2014 |
| WO | WO 2015/017730 A1 | 2/2015 |
| WO | WO 2015/027188 A1 | 2/2015 |
| WO | WO 2016/090331 A1 | 6/2016 |
| WO | WO 2016/106379 A1 | 6/2016 |
| WO | WO 2016/118761 A1 | 7/2016 |
| WO | WO 2016/123156 A1 | 8/2016 |
| WO | WO 2016/123157 A1 | 8/2016 |
| WO | WO 2016/149120 A1 | 9/2016 |
| WO | WO 2016/187591 A1 | 11/2016 |
| WO | WO 2017/066198 A1 | 4/2017 |
| WO | WO 2017081539 A1 | 5/2017 |
| WO | WO 2017081540 A1 | 5/2017 |
| WO | WO 2017081542 A2 | 5/2017 |

OTHER PUBLICATIONS

U.S. Appl. No. 15/007,196, filed Jan. 26, 2016 entitled "Array Level Fourier Ptychographic Imaging".

U.S. Appl. No. 15/007,159, filed Jan. 26, 2016 entitled "Multi-Well Fourier Ptychographic and Fluorescence Imaging".

U.S. Appl. No. 14/979,154, filed Dec. 22, 2015 entitled "EPI-Illumination Fourier Ptychographic Imaging for Thick Samples".

U.S. Appl. No. 15/003,559, filed Jan. 21, 2016 entitled "Fourier Ptychographic Tomography".

U.S. Appl. No. 15/068,389, filed Mar. 11, 2016 entitled "Correcting for Aberrations in Incoherent Imaging Systems Using Fourier Ptychographic Techniques".

U.S. Appl. No. 15/081,659, filed Mar. 25, 2016 entitled "Fourier Ptychographic Retinal Imaging Methods and Systems".

U.S. Office Action dated Oct. 5, 2015 in U.S. Appl. No. 14/065,305.

U.S. Notice of Allowance dated Dec. 4, 2015 in U.S. Appl. No. 14/065,305.

U.S. Notice of Allowance dated Jan. 14, 2016 in U.S. Appl. No. 14/448,850.

U.S. Notice of Allowance dated Jan. 22, 2016 in U.S. Appl. No. 14/466,481.

U.S. Notice of Allowance dated Apr. 13, 2016 in U.S. Appl. No. 14/448,850.

U.S. Notice of Allowance dated Apr. 22, 2016 in U.S. Appl. No. 14/466,481.

International Search Report and Written Opinion dated Feb. 21, 2014 in PCT/US2013/067068.

International Preliminary Report on Patentability dated May 14, 2015 in PCT/US2013/067068.

European Third-Party Observations, dated Dec. 14, 2015 in EP Application No. 13851670.3.

European Extended Search Report dated Mar. 31, 2016 in EP Application No. 13851670.3.

International Preliminary Report on Patentability dated Mar. 3, 2016 issued in PCT/US2014/052351.

International Search Report and Written Opinion dated Dec. 5, 2014 issued in PCT/US2014/052351.

International Search Report and Written Opinion dated Nov. 13, 2014 issued in PCT/US2014/049297.

International Preliminary Report on Patentability dated Feb. 11, 2016 issued in PCT/US2014/049297.

International Search Report and Written Opinion dated Feb. 22, 2016 issued in PCT/US2015/064126.

"About Molemap," Retrieved Oct. 23, 2015, 2 pages. [http://molemap.net.au/about-us/].

Abramomwitz, M. et al, "Immersion Media," Olympus Microscopy Resource Center, 2012, 6 pp. [http://www.olympusmicro.com/primer/anatomy/immersion.html].

Abramomwitz, M., et al, "Field Curvature," Olympus Microscopy Resource Center, 2012, 3 pp. [http://www.olympusmicro.com/primer/anatomy/fieldcurvature.html].

"Age-Related Macular Degeneration (AMD) | National Eye Institute." [Online]. Available: https://www.nei.nih.gov/eyedata/amd#top. [Accessed: Apr. 5, 2016].

Alexandrov, S., et al, "Spatial information transmission beyond a system's diffraction limit using optical spectral encoding of the spatial frequency," Journal of Optics A: Pure and Applied Optics 10, 025304 (2008).

Alexandrov, S.A., et al, "Synthetic Aperture Fourier holographic optical microscopy," Phys. Rev. Lett. 97, 168102 (2006).

Arimoto, H., et al, "Integral three-dimensional imaging with digital reconstruction," Opt. Lett. 26, 157-159 (2001).

Balan, R., et al, "On signal reconstruction without phase, Applied and Computational Harmonic Analysis 20," No. 3 (2006): 345-356.

Balan, R., et al, "Painless reconstruction from magnitudes of frame coefficients," J Fourier Anal Appl 15:488-501 (2009).

(56) References Cited

OTHER PUBLICATIONS

Bauschke, H.H., et al, "Phase retrieval, error reduction algorithm, and Fienup variants: a view from convex optimization," J Opt Soc Am A 19:1334-1345 (2002).
Becker, S., et al, "Templates for convex cone problems with applications to sparse signal recovery," Technical report, Department of Statistics, Stanford University, (2010), 48 Pages.
Betti, R., et al, "Observational study on the mitotic rate and other prognostic factors in cutaneous primary melanoma arising from naevi and from melanoma de novo," Journal of the European Academy of Dermatology and Venereology, 2014.
Bian, L., et al, "Fourier ptychographic reconstruction using Wirtinger flow optimization," Opt. Express 23:4856-4866 (2015).
Bian, Z., et al, "Adaptive system correction for robust Fourier ptychographic imaging," Optics express, 2013. 21(26): p. 32400-32410.
BioTek® Brochure: BioTek's Multi-Mode Microplate Reading Techonologies, 2016, 2 pp. [http://www.biotek.com].
Bishara, W., et al,"Holographic pixel super-resolution in portable lensless on-chip microscopy using a fiber-optic array," Lab Chip 11(7), 1276-1279 (2011).
Bishara, W., et al, "Lensfree on-chip microscopy over a wide field-of-view using pixel super-resolution," Opt. Express 18(11), 11181-11191 (2010).
Blum, A., et al, "Clear differences in hand-held dermoscopes," JDDG: Journal der Deutschen Dermatologischen Gesellschaft, 2006, 4(12): p. 1054-1057.
Blum, A., et al, Dermatoskopie von Hauttumoren: Auflichtmikroskopie; Dermoskopie; digitale Bildanalyse; mit 28 Tabellen. 2003: Springer DE, Chapter 4 "Dermatoskopisch sichtbare Strukturen" p. 15-66.
Born, M., et al, "Principles of Optics: Electromagnetic theory of propagation, interference and diffraction of light" 7th Ed., Cambridge Univ. Press, (1999) pp. 1-31.
Brady, D., et al, "Multiscale gigapixel photography," Nature 486, 386-389 (2012).
Burer, S., et al, "A nonlinear programming algorithm for solving semidefinite programs via low-rank factorization," Math Program, Ser B 95:329-357 (2003).
Burer, S., et al, "Local minima and convergence in low-rank semidefinite programming. Math Program," Ser A 103:427-444 (2005).
Candes, E.J., et al, "Phase retrieval via matrix completion," SIAM J. Imaging Sci. 6:199-225 (2012).
Candes, E.J., et al, "Phase retrieval via Wirtinger flow: theory and algorithms," IEEE Trans. Info. Theory 61:1985-2007 (2015).
Candes, E.J., et al, "PhaseLift: exact and stable signal recovery from magnitude measurements via convex programming.," Comm Pure Appl Math 66:1241-1274 (2013).
Carroll, J., "Adaptive optics retinal imaging: applications for studying retinal degeneration," Arch. Ophthalmol., vol. 126, pp. 857-858, 2008.
Chao, W. et al, "Soft X-ray microscopy at a spatial resolution better than 15 nm," Nature Letters, vol. 435/30, Jun. 2005 pp. 1210-1213.
Chen, T., et al, "Polarization and phase shifting for 3D scanning of translucent objects," Proc. CVPR, (2007).
Chin, L., et al, "Malignant melanoma: genetics and therapeutics in the genomic era," Genes & development, 2006, 20(16): p. 2149-2182.
Choi, W., et al, "Tomographic phase microscopy," Nature Methods 4(9) (2007), pp. 1-3 Published Online Aug. 12, 2007.
Chung, J., et al, "Counting White Blood Cells from a Blood Smear Using Fourier Ptychographic Microscopy," PLoS One 10(7), e0133489 (2015).
Chung, J., et al, "Wide field-of-view fluorescence image deconvolution with aberration-estimation from Fourier ptychography," Feb. 1, 2016, vol. 7, No. 2, Biomedical Optics Express 352.
Colomb, T., et al, "Automatic procedure for aberration compensation in digital holographic microscopy and applications to specimen shape compensation," Appl. Opt. 45, 851-863 (2006).

De Sa, C., et al, "Global convergence of stochastic gradient descent for some non convex matrix problems," Proc. 32nd Int. Conf. Machine Learning (2015), 10 pp.
Debailleul, M., et al, "High-resolution three-dimensional tomographic diffractive microscopy of transparent inorganic and biological samples," Optic Letters 34 (2008).
Denis, L., et al, "Inline hologram reconstruction with sparsity constraints," Opt. Lett. 34, pp. 3475-3477 (2009).
Di, J., et al, "High resolution digital holographic microscopy with a wide field of view based on a synthetic aperture technique and use of linear CCD scanning," Appl. Opt. 47, pp. 5654-5659 (2008).
Dierolf, M., et al, "Ptychographic coherent diffractive imaging of weakly scattering specimens," New J. Phys. 12, 035017 (2010).
"Doctor Mole—Skin Cancer App," Retrieved Oct. 23, 2015, 1 page. [http://www.doctormole.com].
Dong, S., et al, "FPscope: a field-portable high-resolution microscope using a cellphone lens," Biomed. Opt. Express 5(10), 3305-3310 (2014).
Dong, S., et al, "High-resolution fluorescence imaging via pattern-illuminated Fourier ptychography," Opt. Express 22(17), 20856-20870 (2014).
Dong, S., et al, "Aperture-scanning Fourier ptychography for 3D refocusing and super-resolution macroscopic imaging," pp. 13586-13599 (Jun. 2, 2014).
Eldar,Y.C., et al, "Sparse phase retrieval from short-time Fourier measurements," IEEE Signal Processing Letters 22, No. 5 (2015): 638-642.
Emile, O., et al, "Rotating polarization imaging in turbid media," Optics Letters 21(20), (1996).
Faulkner, H.M.L., and Rodenburg, J.M., "Error tolerance of an iterative phase retrieval algorithm for moveable illumination microscopy," Ultramicroscopy 103(2), 153-164 (2005).
Faulkner, H.M.L., and Rodenburg, J.M., "Movable aperture lensless transmission microscopy: a novel phase retrieval algorithm," Phys. Rev. Lett. 93, 023903 (2004).
Fazel, M., "Matrix rank minimization with applications," PhD Thesis (Stanford University, Palo Alto, CA). (2002).
Feng, P., et al, "Long-working-distance synthetic aperture Fresnel off-axis digital holography," Optics Express 17, pp. 5473-5480 (2009).
Fienup, J. R., "Invariant error metrics for image reconstruction," Appl. Opt. 36(32), 8352-8357 (1997).
Fienup, J. R., "Lensless coherent imaging by phase retrieval with an illumination pattern constraint," Opt. Express 14, 498-508 (2006).
Fienup, J. R., "Phase retrieval algorithms: a comparison," Appl. Opt. 21, 2758-2769 (1982).
Fienup, J. R., "Reconstruction of a complex-valued object from the modulus of its Fourier transform using a support constraint," J. Opt. Soc. Am. A 4, 118-123 (1987).
Fienup, J. R., "Reconstruction of an object from the modulus of its Fourier transform," Opt. Lett. 3, 27-29 (1978).
Gan, X., et al, "Image enhancement through turbid media under a microscope by use of polarization gating methods," JOSA A 16(9), (1999).
Gerke T.D., et al, "Aperiodic volume optics," Nature Photonics (2010), vol. 4, pp. 188-193.
Ghosh, A., et al, "Multiview face capture using polarized spherical gradient illumination," ACM Transactions on Graphics 30(6) (2011).
Godara, P., et al, "Adaptive optics retinal imaging: emerging clinical applications.," Optom. Vis. Sci., vol. 87, No. 12, pp. 930-941, Dec. 2010.
Goodman, J.W., "Introduction to Fourier Optics," Roberts & Company Publication, Third Edition, chapters 1-6, pp. 1-172 (2005).
Goodson, A.G., et al, "Comparative analysis of total body and dermatoscopic photographic monitoring of nevi in similar patient populations at risk for cutaneous melanoma," Dermatologic Surgery, 2010. 36(7): p. 1087-1098.
Granero, L., et al, "Synthetic aperture superresolved microscopy in digital lensless Fourier holography by time and angular multiplexing of the object information," Appl. Opt. 49, pp. 845-857 (2010).
Grant, M., et al, "CVX: Matlab software for disciplined convex programming," version 2.0 beta. http://cvxr.com/cvx, (Sep. 2013), 3 pages.

(56) References Cited

OTHER PUBLICATIONS

Greenbaum, A., et al, "Field-portable wide-field microscopy of dense samples using multi-height pixel super resolution based lensfree imaging," Lab Chip 12(7), 1242-1245 (2012).
Greenbaum, A., et al, "Increased space-bandwidth product in pixel super-resolved lensfree on-chip microscopy," Sci. Rep. 3, p. 1717 (2013).
Gruev, V., et al, "Dual-tier thin film polymer polarization imaging sensor," Optics Express, vol. 18, No. 18, 12 pages (2010).
Guizar-Sicairos, M., and Fienup, J.R.,"Phase retrieval with transverse translation diversity: a nonlinear optimization approach," Opt. Express 16, 7264-7278 (2008).
Gunturk, B.K., et al, "Image Restoration: Fundamentals and Advances," vol. 7, Chapter 3, pp. 63-68 (CRC Press, 2012).
Gustafsson, M.G.L., "Surpassing the lateral resolution limit by a factor of two using structured illumination microscopy," J. Microsc. 198, 82-87 (2000).
Gutzler, T., et al, "Coherent aperture-synthesis, wide-field, high-resolution holographic microscopy of biological tissue," Opt. Lett. 35, pp. 1136-1138 (2010).
Haigh, S. J., et al, (2009) "Atomic structure imaging beyond conventional resolution limits in the transmission electron microscope"; Physical Review Letters 103. 126101-1 126101-4.
Han, C., et al, "Wide Field-of-View On-Chip Talbot Fluorescence Microscopy for Longitudinal Cell Culture Monitoring from within the Incubator" Anal. Chem. 85(4), 2356-2360 (2013).
Hillman, T.R., et al, "High-resolution, wide-field object reconstruction with synthetic aperture Fourier holographic optical microscopy," Opt. Express 17, pp. 7873-7892 (2009).
Hofer, H., et al, "Dynamics of the eye's wave aberration," J. Opt. Soc. Am. A, vol. 18, No. 3, p. 497, 2001.
Hofer, H., et al, "Organization of the human trichromatic cone mosaic.," J. Neurosci., vol. 25, No. 42, pp. 9669-9679, Oct. 2005.
Hong, S-H., et al, "Three-dimensional volumetric object reconstruction using computational integral imaging," Opt. Express 12, 483-491 (2004).
Hoppe, W., "Diffraction in inhomogeneous primary wave fields. 1. Principle of phase determination from electron diffraction interference," Acta Crystallogr. A25, 495-501 1969.
Horstmeyer, R., et al, "A phase space model of Fourier ptychographic microscopy," Optics Express, 2014. 22(1): p. 338-358.
Horstmeyer, R., et al, "Digital pathology with fourier ptychography," Comput. Med. Imaging Graphics 42, 38-43 (2015).
Horstmeyer, R., et al, "Overlapped fourier coding for optical aberration removal," Manuscript in preparation, 19 pages (2014).
Horstmeyer, R., et al, "Solving ptychography with a convex relaxation," Physics Optics (2014) 1-8 pages.
Hüe, F., et al, "Wave-front phase retrieval in transmission electron microscopy via ptychography," Phys. Rev. B 82, 121415 (2010).
Humphry, M., et al, "Ptychographic electron microscopy using high-angle dark-field scattering for sub-nanometre resolution imaging," Nat. Commun. 3, 730 (2012).
IncuCyte® ZOOM System, Brochure, 1-4 pp. (2016) (retrieved Feb. 25, 2016), [http://www.essenbioscience.com/media/uploads/files/8000-0333-E00-IncuCyte_ZOOM_brochure.pdf].
Jaganathan, K., et al, "Recovery of sparse 1-D signals from the magnitudes of their Fourier transform," IEEE International Symposium on Information Theory Proceedings (2012): 1473-1477.
Jaganathan, K., et al, "Phase retrieval with masks using convex optimization," IEEE International Symposium on Information Theory Proceedings (2015): 1655-1659.
Jaganathan, K., et al, "STFT Phase retrieval: uniqueness guarantees and recovery algorithms," arXiv preprint arXiv:1508.02820 (2015).
Joeres, S., et al, "Retinal imaging with adaptive optics scanning laser ophthalmoscopy in unexplained central ring scotoma.," Arch. Ophthalmol., vol. 126, No. 4, pp. 543-547, Apr. 2008.
Jung, J.H., et al, "Microfluidic-integrated laser-controlled microactuators with on-chip microscopy imaging functionality," Lab Chip 14 (19), Oct. 7, 2014, pp. 3781-3789.

Kay, D. B., et al, "Outer retinal structure in best vitelliform macular dystrophy.," JAMA Ophthalmol., vol. 131, pp. 1207-1215, 2013.
Kim, J., et al, Incubator embedded cell culture imaging system (EmSight) based on Fourier ptychographic microscopy. EmSight manuscript, Optical Society of America, 2015.
Kim, M., et al, "High-speed synthetic aperture microscopy for live cell imaging," Opt. Lett. 36, pp. 148-150 (2011).
Kirkland, A.I., et al, "Multiple beam tilt microscopy for super resolved imaging;" Japanese Society of Electron Microscopy: Journal of Electron Microscopy I: 11-22(1997), vol. 46, No. 1 1997.
Kirkland, A.I., et al, "Super-resolution by aperture synthesis: tilt series reconstruction in CTEM," Ultramicroscopy 57, (1995) 355-374, Received May 27, 1994, in final form Oct. 2, 1994; 1995 Elsevier Science B.V. SSDI 0304-3991(94)00191-x.
Kittler, H., et al, "Morphologic changes of pigmented skin lesions: a useful extension of the ABCD rule for dermatoscopy," Journal of the American Academy of Dermatology, 1999. 40(4): p. 558-562.
Kozak, I., "Retinal imaging using adaptive optics technology.," Saudi J. Ophthalmol. Off. J. Saudi Ophthalmol. Soc., vol. 28, No. 2, pp. 117-22, Apr. 2014.
Lauer, V., "New Approach to optical diffraction tomography yielding a vector equation of diffraction tomography and a novel tomography microscope," Journal of Microscopy, vol. 205, Pt 2 Feb. 2002, pp. 165-176, The Royal Microscopical Society 2001.
Lee, K., et al, "Synthetic Fourier transform light scattering," Optics Express 21 (2013).
Levoy, M., et al, "Light field microscopy," ACM Trans. Graphics 25, (2006).
Levoy, M., et al, "Recording and controlling the 4D light field in a microscope using microlens arrays," J. Microsc. 235 (2009).
Li, X., et al, "Sparse signal recovery from quadratic measurements via convex programming," SIAM Journal on Mathematical Analysis 45, No. 5 (2013): 3019-3033.
Lohmann, A. W., et al, "Space-bandwidth product of optical signals and systems," J. Opt. Soc. Am. A 13, pp. 470-473 (1996).
Lue, N., et al, "Live Cell Refractometry Using Hilbert Phase Microscopy and Confocal Reflectance Microscopy," The Journal of Physical Chemistry A, 113, pp. 13327-13330 (2009).
LUXEXCEL® Brochure, LUXEXCEL: 3D Printing Service Description, Retrieved Mar. 7, 2016, 5 pp. [http://www.luxexcel.com].
"Lytro," Retrieved Oct. 23, 2015, 6 pp. [https://www.lytro.com/].
Ma, W., et al, "Rapid Acquisition of Specular and Diffuse Normal Maps from Polarized Spherical Gradient Illumination," University of Southern California, Institute for Creative Technologies, 12 pages (2007).
Mahajan, V. N., "Zernike circle polynomials and optical aberrations of systems with circular pupils," Appl. Opt. 33(34), 8121-8124 (1994).
Maiden, A. M., et al, "A new method of high resolution, quantitative phase scanning microscopy," in: M.T. Postek, D.E. Newbury, S.F. Platek, D.C. Joy (Eds.), SPIE Proceedings of Scanning Microscopy, 7729, 2010.
Maiden, A. M., et al, "An improved ptychographical phase retrieval algorithm for diffractive imaging," Ultramicroscopy 109(10), 1256-1262 (2009).
Maiden, A. M., et al, "Superresolution imaging via ptychography," Journal of the Optical Society of America A. Apr. 2011, vol. 28 No. 4, pp. 604-612.
Maiden, A. M., et al, "Optical ptychography: a practical implementation with useful resolution," Opt. Lett. 35, 2585-2587 (2010).
Marchesini S., "A unified evaluation of iterative projection algorithms for phase retrieval," Rev Sci Instrum 78:011301 (2007).
Marchesini S., et al, "Augmented projections for ptychographic imaging," Inverse Probl 29:115009 (2013).
Marrison, J., et al, "Ptychography—a label free, high-contrast imaging technique for live cells using quantitative phase information," Sci. Rep. 3, 2369 (2013).
Medoff, B.P., et al, "Iterative convolution backprojection algorithms for image reconstruction from limited data," J. Opt. Soc. Am. vol. 73, No. 11, Nov. 1983, pp. 1493-1500.
"Melafind," Retrieved Oct. 23, 2015, 4 pages. [http://www.melafind.com/].

(56) References Cited

OTHER PUBLICATIONS

Meyer, R.R., et al, "A method for the determination of the wave aberration function of high-resolution TEM," Ultramicroscopy 99 (2004) 115-123: Elsevier B.V. Doi: 10.1016/j.ultramic.2003.11.001.

Miao, J., et al, "High Resolution 3D X-Ray Diffraction Microscopy," Physical Review Letters, Aug. 19, 2002, vol. 89, No. 8, pp. 1-4.

Mico, V., et al, "Synthetic aperture microscopy using off-axis illumination and polarization coding," Optics Communications, pp. 276, 209-217 (2007).

Mico, V., et al, "Synthetic aperture superresolution with multiple off-axis holograms," JOSA A 23, pp. 3162-3170 (2006).

Mir, M. et al, "Optical measurement of cycle-dependent cell growth," Proceedings of the National Academy of Sciences 108, pp. 13124-13129 (2011).

Mir, M., et al, "Blood screening using diffraction phase cytometry," Journal of Biomedical Optics 15, pp. 027016-027014 (2010).

Moreno, I., "Creating a desired lighting pattern with an LED array," 8th International Conference on Solid State Lighting, Proceedings of SPIE, vol. 7058, 2008, 9 pp.

Mrejen, S., et al, "Adaptive optics imaging of cone mosaic abnormalities in acute macular neuroretinopathy.," Ophthalmic Surg. Lasers Imaging Retina, vol. 45, No. 6, pp. 562-569, Jan. 2014.

Nayar, S. K., et al, "Fast separation of direct and global components of a scene using high frequency illumination," ACM Transactions on Graphics 25(3) (2006).

Ng, R., et al, "Light field photography with a hand-held plenoptic camera", Computer Science Technical Report CSTR, 2005. 2(11).

Nomura, H., and Sato, T., "Techniques for measuring aberrations in lenses used in photolithography with printed patterns," Appl. Opt. 38(13), 2800-2807 (1999).

Ohlsson, H., et al, "Compressive phase retrieval from squared output measurements via semidefinite programming," arXiv:1111.6323 (2011).

Ou, X., et al, "High numerical aperture Fourier ptychography: principle, implementation and characterization," Opt. Express 23:3472-3491 (2015).

Ou, X., et al, "Quantitative phase imaging via Fourier ptychographic microscopy," Optics Letters, 2013. 38(22): p. 4845-4848.

Ou. X., et al, "Embedded pupil function recovery for Fourier ptychographic microscopy," Optics Express 22 (5), pp. 4960-4972 (2014), with Erratum (2015).

Ou. X., et al, "Embedded pupil function recovery for Fourier ptychographic microscopy," submitted Dec. 26, 2013; 13 pp.

Pacheco, S., et al, "Reflective Fourier Ptychography," J. Biomed. Opt. 21(2), pp. 026010-1-026010-7, (Feb. 18, 2016). [http://biomedicaloptics.spiedigitallibrary.org].

Recht, B., et al, "Guaranteed minimum-rank solutions of linear matrix equations via nuclear norm minimization," SIAM Review 52, No. 3 (2010): 471-501.

Reinhard, E., et al, "High Dynamic Range Imaging: Acquisition, Display, and Image-based Lighting" (Morgan Kaufmann, 2010).

Rodenburg, J. M., et al, "A phase retrieval algorithm for shifting illumination," Appl. Phys. Lett. 85, 4795-4797 (2004).

Rodenburg, J. M., et al, "Hard-X-ray lensless imaging of extended objects," Phys. Rev. Lett. 98, 034801 (2007).

Rodenburg, J. M., et al, "The theory of super-resolution electron microscopy via Wigner-distribution deconvolution," Phil. Trans. R. Soc. Lond. A 339, 521-553 (1992).

Rodenburg, J., "Ptychography and related diffractive imaging methods," Adv. Imaging Electron Phys.150, 87-184 (2008).

Rossi, E.A., et al, "In vivo imaging of retinal pigment epithelium cells in age related macular degeneration.," Biomed. Opt. Express, vol. 4, No. 11, pp. 2527-2539, Jan. 2013.

Rowe, M., et al, "Polarization-difference imaging: a biologically inspired technique for observation through scattering media," Optics Letters, vol. 20, No. 6, 3 pages (1995).

Schechner, Y., "Multiplexing for Optimal Lighting," IEEE Transactions on Pattern Analysis and Machine Intelligence, vol. 29, No. 8, 1339-1354 (2007).

Schnars, U., et al, "Digital recording and numerical reconstruction of holograms," Measurement Science and Technology, 13, R85 (2002).

Schwarz, C., et al, "Imaging interferometric microscopy," Optics letters 28, pp. 1424-1426 (2003).

Shechner, Y., et al, "Polarization-based vision through haze," Applied Optics 42(3), (2003).

Shechtman, Y., et al, "Sparsity based sub-wavelength imaging with partially incoherent light via quadratic compressed sensing," Opt Express 19:14807-14822 (2011).

Siegel, R., et al, "Cancer statistics 2013," CA: a cancer journal for clinicians, 2013. 63(1): p. 11-30.

Stoecker, W., et al, "Diagnostic Inaccuracy of Smartphone Applications for Melanoma Detection: Representative Lesion Sets and the Role for Adjunctive Technologies," JAMA Dermatology, 2013. 149(7): p. 884.

Sun, D., et al, "Estimating a signal from a magnitude spectrogram via convex optimization," arXiv:1209.2076 (2012).

Sun, J., et al, "Coded multi-angular illumination for Fourier ptychography based on Hadamard codes," 5 pages (2015).

Tam, K., et al, "Tomographical imaging with limited-angle input," J. Opt. Soc. Am. 21 (1981).

Thibault, P. et al, "Probe retrieval in ptychographic coherent diffractive imaging," Ultramicroscopy 109(4), 338-343 (2009).

Thibault, P., et al, "High-resolution scanning X-ray diffraction microscopy," Science 321, 2008, pp. 379-382.

Thomas, L., et al, "Semiological value of ABCDE criteria in the diagnosis of cutaneous pigmented tumors," Dermatology, 1998. 197(1): p. 11-17.

Tian, L., et al, "Multiplexed Coded Illumination for Fourier Ptychography with an LED Array Microscope," Optical Society of America, 14 pages (2014).

Tippie, A.E., et al, "High-resolution synthetic-aperture digital holography with digital phase and pupil correction," Opt. Express 19, pp. 12027-12038 (2011).

Turpin, T., et al, "Theory of the synthetic aperture microscope," pp. 230-240 (1995).

Tyson, R., "Principles of Adaptive Optics" (CRC Press, 2010).

Vulovic, M., et al, "When to use the projection assumption and the weak-phase object approximation in phase contrast cryo-EM," Ultramicroscopy 136 (2014) 61-66.

Waldspurger, I., et al, "Phase recovery, maxcut and complex semidefinite programming," Mathematical Programming 149, No. 1-2 (2015): 47-81.

Wang, Q., et al, "Adaptive Optics Microperimetry and OCT Images Show Preserved Function and Recovery of Cone Visibility in Macular Telangiectasia Type 2 Retinal Lesions," Invest. Ophthalmol. Vis. Sci., vol. 56, pp. 778-786, 2015.

Wang, Z., et al, "Tissue refractive index as marker of disease," Journal of Biomedical Optics 16, 116017-116017 (2011).

Watanabe, M., et al, "Telecentric optics for focus analysis," IEEE trans. pattern. anal. mach. intell., 19 1360-1365 (1997).

Wesner, J., et al, "Reconstructing the pupil function of microscope objectives from the intensity PSF," in Current Developments in Lens Design and Optical Engineering III, R. E. Fischer, W. J. Smith, and R. B. Johnson, eds., Proc. SPIE 4767, 32-43 (2002).

Williams, A., et al, "Fourier ptychographic microscopy for filtration-based circulating tumor cell enumeration and analysis," J. Biomed. Opt. 19(6), 066007 (2014).

Wolf, J., et al, "Diagnostic Inaccuracy of Smartphone Applications for Melanoma Detection," JAMA Dermatology, 2013, 149(7): p. 885-885.

Wu, J., et al, "Focal plane tuning in wide-field-of-view microscope with Talbot pattern illumination," Opt. Lett. 36, 2179-2181 (2011).

Wu, J., et al, "Wide field-of-view microscope based on holographic focus grid illumination," Opt. Lett. 35, 2188-2190 (2010).

Xu, W., et al, "Digital in-line holography for biological applications," Proc. Natl Acad. Sci. USA 98, pp. 11301-11305 (2001).

Yuan, C., et al, "Angular multiplexing in pulsed digital holography for aperture synthesis," Optics Letters 33, pp. 2356-2358 (2008).

Zeiss, C., "Microscopy, Cells Need the Perfect Climate, System Solutions for Live Cell Imaging under Physiological Conditions," printed Feb. 2008, 1-42 pgs.

(56) References Cited

OTHER PUBLICATIONS

Zhang, Y., et al, "Self-learning based fourier ptychographic microscopy," Optics Express, 16pgs (2015).
Zhang, Y., et al, "Photoreceptor Perturbation Around Subretinal Drusenoid Deposits as Revealed by Adaptive Optics Scanning Laser Ophthalmoscopy," Am. J. Ophthalmol., vol. 158, No. 3, pp. 584-596, 2014.
Zheng, G., et al, "Characterization of spatially varying aberrations for wide field-of-view microscopy," Opt. Express 21, 15131-15143 (2013).
Zheng, G., et al, "Microscopy refocusing and dark-field imaging by using a simple LED array," Opt. Lett. 36, 3987-3989 (2011).
Zheng, G., et al, "0.5 gigapixel microscopy using a flatbed scanner," Biomed. Opt. Express 5, 1-8 (2014).
Zheng, G., et al, "Sub-pixel resolving optofluidic microscope for on-chip cell imaging," Lab Chip 10, pp. 3125-3129 (2010).
Zheng, G. "The ePetri dish, an on-chip cell imaging platform based on subpixel perspective sweeping microscopy (SPSM)," Proc. Natl. Acad. Sci. USA 108, pp. 16889-16894 (2011).
Zheng, G., et al, "Wide-field, high-resolution Fourier ptychographic microscopy," Nature Photonics, vol. 7, pp. 739-745, Published Online Jul. 28, 2013 at www.nature.com/naturephotonics.
Preliminary Amendment dated Mar. 17, 2014 filed in U.S. Appl. No. 14/065,280.
Preliminary Amendment dated Apr. 25, 2016 filed in U.S. Appl. No. 14/710,947.
Preliminary Amendment dated Nov. 28, 2016 filed in U.S. Appl. No. 15/206,859.
Preliminary Amendment dated Mar. 17, 2014 filed in U.S. Appl. No. 14/065,305.
Preliminary Amendment dated Nov. 28, 2016 filed in U.S. Appl. No. 15/209,604.
U.S. Office Action dated Jul. 14, 2016 in U.S. Appl. No. 15/007,196.
U.S. Notice of Allowance dated Aug. 23, 2016 in U.S. Appl. No. 14/466,481.
U.S. Office Action dated Aug. 16, 2016 in U.S. Appl. No. 14/065,280.
U.S. Office Action dated Sep. 16, 2016 in U.S. Appl. No. 14/065,305.
U.S. Notice of Allowance dated Nov. 2, 2016 in U.S. Appl. No. 14/572,493.
U.S. Office Action dated Nov. 22, 2016 in U.S. Appl. No. 15/003,559.
U.S. Supplemental Notice of Allowance dated Dec. 12, 2016 in U.S. Appl. No. 14/572,493.
U.S. Notice of Allowance dated Jan. 13, 2017 in U.S. Appl. No. 14/065,305.
U.S. Final Office Action dated Jan. 23, 2017 in U.S. Appl. No. 15/007,196.
U.S. Supplemental Notice of Allowability dated Mar. 2, 2017 in U.S. Appl. No. 14/065,305.
U.S. Notice of Allowance dated Mar. 8, 2017 in U.S. Appl. No. 14/572,493.
U.S. Office Action dated Mar. 13, 2017 in U.S. Appl. No. 14/658,019.
U.S. Notice of Allowance dated Mar. 22, 2017 in U.S. Appl. No. 15/007,196.
U.S. Office Action dated Mar. 24, 2017 in U.S. Appl. No. 14/710,947.
U.S. Notice of Allowance dated Mar. 31, 2017 in U.S. Appl. No. 14/572,493.
U.S. Final Office Action dated Apr. 3, 2017 in U.S. Appl. No. 14/065,280.
U.S. Notice of Allowance dated Jun. 9, 2017 in U.S. Appl. No. 14/065,305.
U.S. Notice of Allowance dated Jun. 9, 2017 in U.S. Appl. No. 15/206,859.
U.S. Notice of Allowance dated Jun. 9, 2017 in U.S. Appl. No. 15/007,196.
U.S. Notice of Allowance dated Jun. 20, 2017 in U.S. Appl. No. 14/572,493.
U.S. Supplemental Notice of Allowance dated Jun. 28, 2017 in U.S. Appl. No. 15/206,859.
U.S. Final Office Action dated Jul. 27, 2017 in U.S. Appl. No. 15/003,559.
U.S. Notice of Allowance dated Aug. 16, 2017 in U.S. Appl. No. 15/209,604.
International Search Report and Written Opinion dated Apr. 19, 2016 issued in PCT/US2015/067498.
International Search Report and Written Opinion dated May 4, 2016 issued in PCT/US2016/015001.
International Search Report and Written Opinion dated May 11, 2016 issued in PCT/US2016/015002.
International Search Report and Written Opinion dated Jun. 27, 2016 issued in PCT/US2016/022116.
International Search Report and Written Opinion dated Jun. 30, 2016 issued in PCT/US2016/014343.
International Search Report and Wrtitten Opinion dated Sep. 5, 2016 issued in PCT/US2016/033638.
Chinese Office Action [Description in English] dated Jul. 11, 2016 issued in Application No. CN 201380068831.6.
Chinese Office Action [Description in English] dated Dec. 13, 2016 issued in Application No. CN201480057911.6.
Extended European Search Report dated Feb. 16, 2017 issued in Application No. 14837844.1.
Extended European Search Report dated Feb. 15, 2017 issued in Applicatoin No. 14832857.8.
Chinese Second Office Action [Description in English] dated Feb. 17, 2017 issued in Application No. CN201380068831.6.
International Preliminary Report on Patentability dated Jun. 15, 2017 issued in Application No. PCT/US2015/064126.
European Office Action dated May 16, 2017 issued in European Patent Application No. 13851670.3.
International Preliminary Report on Patentability dated Jul. 6, 2017 issued in Application No. PCT/US2015/067498.
International Preliminary Report on Patentability dated Aug. 3, 2017 issued in Application No. PCT/US2016/014343.
International Preliminary Report on Patentability dated Aug. 10, 2017 issued in Application No. PCT/US2016/015001.
International Preliminary Report on Patentability dated Aug. 10, 2017 issued in Application No. PCT/US2016/015002.
Bian, L., et al, "Fourier ptychographic reconstruction using Poisson maximum likelihood and truncated Wirtinger gradient," Nature Publishing Group; Scientific Reports, vol. 6, No. 27384, Jun. 10, 2016, pp. 1-10. <doi: 10.1038/srep27384>.
Bunk, O., et al, "Influence of the overlap parameter on the convergence of the ptychographical iterative engine," Ultramicroscopy, vol. 108, (2008), pp. 481-487. <doi:10.1016/j.ultramic.2007.08.003>.
Chai, A., et al, "Array imaging using intensity-only measurements," IOP Publishing: Inverse Problems, vol. 27, No. 1, Jan. 2011, pp. 1-16. <doi:10.1088/0266-5611/27/1/015005>.
Chung, J., et al, pre-published manuscript of "Wide-field Fourier ptychographic microscopy using laser illumination source," ArXiv e-prints (Submitted on Feb. 9, 2016 (v1), last revised Mar. 23, 2016 (this version, v2)). [retrieved on May 20, 2016] <URL:arXiv:1602.02901v2 [physics.optics] Mar. 23, 2016>.
Dierolf, M., et al, "Ptychographic X-ray computed tomography at the nanoscale," Nature|Letter, vol. 467, Sep. 23, 2010, pp. 436-439. <doi:10.1038/nature09419>.
Guo, K., et al, "Optimization of sampling pattern and the design of Fourier ptychographic illuminator," Optics Express, vol. 23, No. 5, Mar. 9, 2015, pp. 6171-6180. <doi: 10.1364/OE.23.006171>.
Hoppe, W., "Diffraction in inhomogeneous primary wave fields. 1. Principle of phase determination from electron diffraction interference." Acta Crystallographica Section a—Crystal Physics Diffraction Theoretical and General Crystallography, A25, Jan. 1, 1969, pp. 495-501. (English Machine Translation Incl.).
Horstmeyer, R., et al, "Diffraction tomography with Fourier ptychography," Optica, Optical Society of America, vol. 3, No. 8, Aug. 2016, pp. 827-835. <doi:10.1364/OPTICA.3.000827>.
Horstmeyer, R., et al, "Solving ptychography with a convex relaxation," New Journal of Physics, vol. 17, May 27, 2015, pp. 1-14. <doi: 10.1088/1367-2630/17/5/053044> [URL: http://iopscience.iop.org/1367-2630/17/5/053044].
Horstmeyer, R., et al, "Standardizing the resolution claims for coherent microscopy," Nature Photonics | Commentary, vol. 10, No.

(56) References Cited

OTHER PUBLICATIONS

2, Feb. 2016, pp. 68-71. <doi:10.1038/nphoton.2015.279> [URL:http://dx.doi.org/10.1038/nphoton.2015.279].
Kawata, S. et al, "Optical microscope tomography. I. Support constraint," Journal Optical Society America A, vol. 4, No. 1, Jan. 1987, pp. 292-297. <doi:10.1364/JOSAA.4.000292>.
Kim, M., et al, "High-speed synthetic aperture microscopy for live cell imaging," Optics Letters, vol. 36, No. 2, Jan. 15, 2011, pp. 148-150. <doi:10.1364/OL.36.000148>.
Lu, H., et al, "Quantitative phase imaging and complex field reconstruction by pupil modulation differential phase contrast," Optics Express, vol. 24, No. 22, Oct. 31, 2016, pp. 25345-25361. <doi:10.1364/OE.24.025345>.
Ou, X., et al, "Aperture scanning Fourier ptychographic microscopy," Biomedical Optics Express, vol. 7, No. 8, Aug. 1, 2016, pp. 3140-3150. <doi:10.1364/BOE.7.003140>.
Phillips, Z., et al, "Multi-Contrast Imaging and Digital Refocusing on a Mobile Microscope with a Domed LED Array," PLoS One, vol. 10, No. 5, May 13, 2015, pp. 1-13. <doi:10.1371/journal.pone.0124938>.
Reinhard, E., et al, "High Dynamic Range Imaging: Acquisition, Display, and Image-based Lighting" Second Edition § 5.2 HDR Image Capture: Morgan Kaufmann, May 28, 2010, pp. 148-151. <ISBN: 9780123749147>.
Tian, L., et al, "3D differential phase-contrast microscopy with computational illumination using an LED array," Optics Letters, vol. 39, No. 5, Mar. 1, 2014, pp. 1326-1329. <doi:10.1364/OL39.001326>.
Tian, L., et al, "Computational illumination for high-speed in vitro Fourier ptychographic microscropy," Optica: Research Article, vol. 2, No. 10, Oct. 14, 2015, pp. 904-911. <doi:10.1364/OPTICA.2.000904>.
Wu, J., et al, "Harmonically matched grating-based full-field quantitative high-resolution phase microscope for observing dynamics of transparent biological samples," Optics Express, vol. 15, No. 26, Dec. 24, 2007, pp. 18141-18155. <doi:10.1364/OE.15.018141>.
Wu, J., et al, "Paired-angle-rotation scanning optical coherence tomography forward-imaging probe," Optics Letters, vol. 31, No. 9, May 1, 2006, pp. 1265-1267. <doi:10.1364/OL.31.001265>.
Yeh, et al., "Experimental robustness of Fourier ptychography phase retrieval algorithms," Optics Express, vol. 23, No. 26, Dec. 28, 2015, pp. 33214-33240. <doi: 10.1364/OE.23.033214>.
Zheng, G., "Fourier Ptychographic Imaging: A MATLAB tutorial," IOP Concise Physics, Morgan & Claypool Publication, San Rafael, CA., May 2016, pp. 96. <ISBN: 978-1-6817-4272-4 (ebook)> <doi:10.1088/978-1-6817-4273-1>.
U.S. Appl. No. 15/620,674, filed Jun. 12, 2017, Chung, J. et al.
U.S. Appl. No. 15/636,494, filed Jun. 28, 2017, Kim, J. et al.
U.S. Office Action dated May 19, 2017 in U.S. Appl. No. 15/081,659.
Office Action dated Aug. 31, 2017 in U.S. Appl. No. 15/636,494.
U.S. Notice of Allowance dated Sep. 1, 2017 in U.S. Appl. No. 15/206,859.
Notice of Allowance dated Sep. 20, 2017 in U.S. Appl. No. 15/007,196.
Notice of Allowance dated Oct. 11, 2017 in U.S. Appl. No. 14/572,493.
Notice of Allowance dated Oct. 20, 2017 in U.S. Appl. No. 15/081,659.
Office Action dated Nov. 3, 2017 in U.S. Appl. No. 15/068,389.
Office Action Interview Summary dated May 3, 2018 in U.S. Appl. No. 15/068,389.
Final Office Action dated Jun. 6, 2018 issued in U.S. Appl. No. 15/068,389.
Office Action dated Nov. 30, 2017 in U.S. Appl. No. 15/007,159.
Notice of Allowance dated Dec. 4, 2017 in U.S. Appl. No. 14/065,305.
Final Office Action dated Dec. 28, 2017 in U.S. Appl. No. 14/710,947.
Final Office Action dated Jan. 17, 2018 in U.S. Appl. No. 14/658,019.
Notice of Allowance dated Jan. 23, 2018 in U.S. Appl. No. 15/206,859.
Office Action dated Jan. 25, 2018 in U.S. Appl. No. 14/065,280.
Notice of Allowance dated Jan. 26, 2018 in U.S. Appl. No. 15/209,604.
Notice of Allowance dated Feb. 9, 2018 in U.S. Appl. No. 15/081,659.
Office Action dated Apr. 4, 2018 issued in U.S. Appl. No. 15/003,559.
Office Action dated Apr. 13, 2018 issued in U.S. Appl. No. 15/160,941.
European Extended Search Report dated Jun. 6, 2018 issued in Application No. 15865492.1.
Chinese Third Office Action [Summary in English] dated Jul. 24, 2017 issued in Application No. 201380068831.6.
Chinese First Office Action [Summary in English] dated Aug. 2, 2017 issued in Application No. CN 201480054301.0.
Australian Office Action dated Sep. 18, 2017 issued in Application No. AU 2014296034.
International Preliminary Report on Patentability dated Sep. 28, 2017 issued in Application No. PCT/US2016/022116.
Japanese Office Action dated Oct. 17, 2017 issued in Application No. 2015-539884.
Chinese Office Action [Summary in English] dated Oct. 26, 2017 issued in CN 201480057911.6.
International Preliminary Report on Patentability dated Nov. 30, 2017 issued in PCT/US2016/033638.
Australian Examination Report 1/Office Action dated Jan. 18, 2018 issued in AU 2014308673.
Chinese First Office Action dated Feb. 24, 2018 issued in CN 201680003937.1.
Abrahamsson, S., et al., "Fast multicolor 3D imaging using aberration-corrected mulitfocus microscopy," Brief Communications: Nature Methods, vol. 10, No. 1, Jan. 2013, pp. 60-65. <doi:10.1038/nmeth.2277>.
Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. <doi:10.1126/sciadv.1602564> [retrieved on Nov. 28, 2017] <URL:http://advances.sciencemag.org/>.
Jenson, et al. "Types of imaging, Part 2: An Overview of Fluorescence Microscopy." The Anatomical Record, vol. 295, No. 10, Oct. 1, 2012, pp. 1621-1627.
Kner, P., "Phase diversity for three-dimensional imaging," Journal of the Optical Society of America A, vol. 30, No. 10, Oct. 1, 2013, pp. 1980-1987. <doi:10.1364/JOSAA.30.001980>.
Sarder, et al. "Deconvolution Methods for 3-D Fluorescence Microscopy Images," IEEE Signal Processing Magazine, vol. 23, No. 3, May 2006, pp. 32-45.
Sankaranarayanan, Aswin C., et al, "CS-MUVI: Video Compressive Sensing for Spatial-Multiplexing Cameras," Proceedings of the IEEE International Conference Computational Photography (ICCP), Apr. 2012, pp. 11. <doi:10.1109/ICCPhot.2012.6215212>.
Wills, S., "Synthetic Apertures for the Optical Domain," Optics & Photonics News Article [webpage], The Optical Society (OSA), Apr. 18, 2017, pp. 2. <URL:https://www.osa-opn.org/home/newsroom/2017/april/synthetic_apertures_for_the_optical_domain/>.
Zheng, G., et al, "Wide-field, high-resolution Fourier ptychographic microscopy," Nature Photonics, vol. 7, Sep. 2013, Published Online Jul. 28, 2013, pp. 739-746. <doi:10.1038/NPHOTON.2013.187>.
U.S. Appl. No. 15/963,966, filed Apr. 26, 2018, Ou et al.
U.S. Appl. No. 15/959,050, filed Apr. 20, 2018, Horstmeyer et al.
Preliminary Amendment dated Jun. 13, 2018 filed in U.S. Appl. No. 15/820,295.
U.S. Final Office Action dated Nov. 29, 2018 in U.S. Appl. No. 14/065,280.
U.S. Office Action dated Dec. 26, 2018 in U.S. Appl. No. 15/963,966.
U.S. Notice of Allowance dated Apr. 19, 2019 in U.S. Appl. No. 15/963,966.
U.S. Office Action dated Dec. 26, 2018 in U.S. Appl. No. 15/959,050.
U.S. Notice of Allowance dated Sep. 17, 2018 in U.S. Appl. No. 15/820,295.
U.S. Notice of Allowance dated Jan. 14, 2019 in U.S. Appl. No. 15/820,295.
U.S. Notice of Allowance dated Apr. 16, 2019 in U.S. Appl. No. 15/820,295.
U.S. Office Action dated Oct. 4, 2018 in U.S. Appl. No. 14/658,019.
U.S. Notice of Allowance dated Jul. 25, 2018 in U.S. Appl. No. 14/710,947.
U.S. Office Action dated Mar. 8, 2019 in U.S. Appl. No. 16/171,270.

(56) References Cited

OTHER PUBLICATIONS

U.S. Notice of Allowance dated Jun. 27, 2018 in U.S. Appl. No. 15/636,494.
U.S. Notice of Allowance dated Oct. 5, 2018 in U.S. Appl. No. 15/636,494.
U.S. Notice of Allowance dated Jul. 16, 2018 in U.S. Appl. No. 15/007,159.
U.S. Office Action dated Apr. 4, 2019 in U.S. Appl. No. 16/162,271.
U.S. Office Action dated Sep. 7, 2018 in U.S. Appl. No. 14/979,154.
U.S. Final Office Action dated Dec. 10, 2018 issued in U.S. Appl. No. 15/003,559.
U.S. Office Action dated Jan. 17, 2019 issued in U.S. Appl. No. 15/068,389.
U.S. Notice of Allowance dated Oct. 19, 2018 issued in U.S. Appl. No. 15/160,941.
U.S. Notice of Allowance dated Jan. 15, 2019 issued in U.S. Appl. No. 15/620,674.
U.S. Notice of Allowance dated Apr. 29, 2019 issued in U.S. Appl. No. 15/620,674.
Chinese Third Office Action dated Jul. 13, 2018 issued in CN 201480057911.6.
Japanese First Office Action dated Aug. 7, 2018 issued in Application No. JP 2016-531919.
Chinese First Office Action dated Jan. 28, 2019 issued in CN 201580072950.8.
Extended European Search Report dated Aug. 8, 2018 issued in Application No. EP 16744002.3.
European Extended Search Report dated Aug. 14, 2018 issued in EP 16744003.1.
Chinese First Office Action dated Dec. 28, 2018 issued in Application No. CN 201680005491.6.
Chinese Office Action [Description in English] dated May 31, 2016 issued in Application No. CN 201380068831.6.
Chinese Second Office Action [Description in English] dated Jan. 22, 2017 issued in Application No. CN201380068831.6.
Chinese First Office Action dated Apr. 19, 2019 issued in Application No. CN 201680006738.6.
Chinese First Office Action dated Dec. 26, 2018 issued in Application No. CN 201580067354.0.
Extended European Search Report dated Jul. 3, 2018 issued in Application No. EP 15874344.3.
Extended European Search Report dated Sep. 12, 2018 issued in Application No. EP 16740769.1.
Chinese Second Office Action dated Jul. 3, 2018 issued in Application No. CN 201480054301.0.
Extended European Search Report dated Oct. 25, 2018 issued in Application No. EP 16765505.9.
Chinese First Office Action dated Apr. 19, 2019 issued in Application No. CN 201680014898.5.
International Search Report and Written Opinion dated Feb. 22, 2019 issued in PCT/US2018/059059.
Godden, T.M. et al., "Ptychographic microscope for three-dimensional imaging," Optics Express, vol. 22, No. 10, May 19, 2014, pp. 12513-12523.
Jacques, et al., "Imaging Superficial Tissues With Polarized Light," Lasers in Surgery and Medicine, vol. 26, No. 2, Apr. 25, 2000, pp. 119-129.
Maiden, A.M., et al., "Ptychographic transmission microscopy in three dimensions using a multi-slice approach," Journal of the Optical Society of America A., vol. 29, No. 8, Aug. 1, 2012, pp. 1606-1614.
Pankajakshan, P., "Blind Deconvolution for Confocal Laser Scanning Microscopy," Doctoral dissertation, Universite Nice Sophia Antipolis, 2009. <URL: https://tel.archives-ouvertes.fr/tel-00474264>.
U.S. Appl. No. 16/242,934, filed Jan. 8, 2019, Kim et al.
U.S. Appl. No. 16/252,465, filed Jan. 18, 2019, Ou et al.
U.S. Office Action dated Jun. 26, 2019 issued in U.S. Appl. No. 14/065,280.

U.S. Final Office Action dated Jun. 3, 2019 in U.S. Appl. No. 15/959,050.
U.S. Final Office Action dated May 30, 2019 in U.S. Appl. No. 14/658,019.
U.S. Final Office Action dated May 30, 2019 in U.S. Appl. No. 14/979,154.
U.S. Office Action dated Jun. 26, 2019 issued in U.S. Appl. No. 15/003,559.
U.S. Final Office Action dated Jun. 19, 2019 issued in U.S. Appl. No. 15/068,389.
U.S. Notice of Allowance dated Aug. 14, 2019 issued in U.S. Appl. No. 15/620,674.
US Ex Parte Quayle Action dated Aug. 8, 2019 issued in U.S. Appl. No. 16/242,934.
U.S. Appl. No. 16/552,948, filed Aug. 27, 2019, Chung et al.
U.S. Notice of Allowance dated Nov. 4, 2019 issued in U.S. Appl. No. 16/242,934.
U.S. Notice of Allowance dated Sep. 16, 2019 issued in U.S. Appl. No. 15/068,389.
U.S. Office Action dated Sep. 23, 2019 issued in U.S. Appl. No. 16/252,465.
U.S. Notice of Allowance dated Sep. 25, 2019 issued in U.S. Appl. No. 15/620,674.
U.S. Office Action dated Oct. 11, 2019 issued in U.S. Appl. No. 16/179,688.
Adie, et al., "Computational adaptive optics for broadband optical interferometric tomography of biological tissue," Proc. Natl. Acad. Sci. USA 109, 7175-7180 (May 8, 2012).
Bian, et al., "Content adaptive illumination for Fourier ptychography," Optics Letters, vol. 39, Aug. 2014, pp. 1-6.
Bioucas-Dias, et al., "Total variation-based image deconvolution: a majorization-minimization approach," ICASSP (2), pp. 861-864 (May 14, 2006).
Booth, "Adaptive optical microscopy: the ongoing quest for a perfect image," Light Sci. Appl. 3, e165 (Apr. 25, 2014 ).
Chung, et al., "Computational aberration compensation by coded-aperture-based correction of aberration obtained from optical Fourier coding and blur estimation," Optica, vol. 6, May 10, 2019, pp. 647-661.
Desjardins, et al., "Angle-resolved Optical Coherence Tomography with sequential selectivity for speckle reduction" Optics Express, vol. 15, No. 10, May 14, 2007, pp. 6200-6209.
Dowski, et al., "Extended depth of field through wavefront coding," Applied Optics, vol. 34, No. 11, Apr. 10, 1995, pp. 1859-1866.
Evered, et al., "Accuracy and perceptions of virtual microscopy compared with glass slide microscopy in cervical cytology," Cytopathology, vol. 22, Feb. 2, 2010, pp. 82-87.
Fergus, et al., "Removing camera shake from a single photograph," ACM Trans. Graph. 25, 787-794 (2006).
Fienup and Miller, "Aberration correction by maximizing generalized sharpness metrics," J. Opt. Soc. Am. A 20, pp. 609-620 (Apr. 2003).
Fried, D.L.,"Anisoplanatism in adaptive optics," J. Opt. Soc. Am. vol. 72, No. 1, Jan. 1982, pp. 52-61.
Gunjala, et al., "Aberration recovery by imaging a weak diffuser," Optics Express vol. 26, No. 16, Aug. 6, 2018, pp. 21054-21068.
McConnell, et al., "A novel optical microscope for imaging large embryos and tissue volumes with sub-cellular resolution throughout," eLife 5, e18659, Sep. 23, 2016, pp. 1-15.
Muyo, et al., "Wavefront coding for athermalization of infrared imaging systems," Proc. SPIE 5612, Dec. 6, 2004, pp. 227-235.
Muyo, et al., "Infrared imaging with a wavefront-coded singlet lens," Optics Express, vol.17, Nov. 5, 2009, pp. 21118-21123.
Ginner, et al., "Holographic line field en-face OCT with digital adaptive optics in the retina in vivo," Biomed. Opt. Express 9, 472-485 (Feb. 1, 2018).
Ginner, et al., "Noniterative digital aberration correction for cellular resolution retinal optical coherence tomography in vivo," Optica, vol. 4, Aug. 2017, pp. 924-931.
Gustafsson, M.,"Nonlinear structured-illumination microscopy: widefield fluorescence imaging with theoretically unlimited resolution," Proc. Natl. Acad. Sci. USA 102, 13081-13086 (Sep. 13, 2005).

(56) References Cited

OTHER PUBLICATIONS

H. Hofer, L. Chen, G. Y. Yoon, B. Singer, Y. Yamauchi, and D. R. Williams, "Improvement in retinal image quality with dynamic correction of the eye's aberrations," Opt. Express 8, 631-643 (May 21, 2001).

Hillmann, et al., "Aberration-free volumetric high-speed imaging of in vivo retina," Sci. Rep. 6, 35209 (Oct. 20, 2016).

Kamal, et al., "In situ retrieval and correction of aberrations in moldless lenses using Fourier ptychography," Opt. Express, vol. 26, No. 3, pp. 2708-2719 (Feb. 5, 2018).

Kuang, et al., "Digital micromirror device-based laserillumination Fourier ptychographic microscopy," Optics Express, vol. 23, Oct. 5, 2015, pp. 26999-27010.

Kubala, et al., "Reducing complexity in computational imaging systems," Optics Express vol. 11, Sep. 8, 2003, pp. 2102-2108.

Kumar, et al., "Subaperture correlation based digital adaptive optics for full field optical coherence tomography," Optics Express, vol. 21, May 6, 2013, pp. 10850-10866.

Kundur, et al., "Blind Image Deconvolution," IEEE Signal Processing Magazine, vol. 13, No. 3, May 1996, pp. 43-64.

Levin et al., "Image and depth from a conventional camera with a coded aperture," ACM Transactions on Graphics, vol. 26, No. 3, Article 70, Jul. 2007, pp. 70-1-70-9.

Levin, et al., "Understanding blind deconvolution algorithms," IEEE Trans. Pattern Anal. Mach. Intell., vol. 33, No. 12, Dec. 2011, pp. 2354-2367.

Li, et al., "Separation of three dimensional scattering effects in tilt-series Fourier ptychography," Ultramicroscopy 158, 1-7 (Jun. 14, 2015).

Li, et al., "GPU accelerated parallel FFT processing for Fourier transform hyperspectral imaging," Applied Optics, vol. 54, No. 13, May 1, 2015, pp. D91-D98.

Marcos, et al., "Vision science and adaptive optics, the state of the field," Vision Research, vol. 132, Feb. 27, 2017, pp. 3-33.

Martins da Silva et al., "Photosensitivity and epilepsy: current concepts and perspectives—a narrative review," Seizure, vol. 50, Apr. 4, 2017, pp. 209-218.

Neumaier, "Solving ill-conditioned and singular linear systems: a tutorial on regularization," SIAM Rev. 40, (1998), pp. 636-666.

Pan, et al., "Subwavelength resolution Fourier ptychography with hemispherical digital condensers," Opt. Express 26, 23119-23131 (Sep. 3, 2018).

Pan, et al., "System calibration method for Fourier ptychographic microscopy," J. Biomed. Opt. 22, 096005 (Sep. 12, 2017).

Pan, et al., "Three-dimensional space optimization for near-field ptychography," Opt. Express 27, 5433-5446 (Feb. 18, 2019).

Qian, et al., "Large-scale 3D imaging of insects with natural color," Opt. Express 27, 4845-4857 (Feb. 18, 2019).

Reinig, et al., "Adaptative optics microscopy enhances image quality in deep layers of CLARITY processed brains of YFP-H mice" Proc., of SPIE, vol. 9690, (Mar. 9, 2016) pp. 969008-1-969008-12. <doi: 10.1117/12.2213283>.

Rha, et al., "Adaptive optics flood-illumination camera for high speed retinal imaging," Opt. Express vol. 14, May 15, 2006, pp. 4552-4569.

Shemonski, et al., "Computational high-resolution optical imaging of the living human retina," Nat. Photonics, vol. 9, Jul. 2015, pp. 440-443.

Soulez, et al., "Blind deconvolution of 3D data in wide field fluorescence microscopy" In 2012 9th IEEE International Symposium on Biomedical Imaging (ISBI) May 2, 2012, pp. 1735-1738.

Sun, et al., "Efficient positional misalignment correction method for Fourier ptychographic microscopy," Biomedical Optics Express vol. 7, No. 4, Mar. 17, 2016, pp. 1336-1350.

Sun, et al., "Resolution-enhanced Fourier ptychographic microscopy based on high-numerical-aperture illuminations," Scientific Reports, vol. 7, No. 1187, Apr. 26, 2017, pp. 1-11.

Sun, et al., "Sampling criteria for Fourier ptychographic microscopy in object space and frequency space," Optics Express vol. 24, No. 14, Jul. 11, 2016, pp. 15765-15781.

Thiébaut and Conan, "Strict a priori constraints for maximumlikelihood blind deconvolution," J. Opt. Soc. Am. A, vol. 12, No. 3, Mar. 1995, pp. 485-492.

Tian and Waller, "3D intensity and phase imaging from light field measurements in an LED array microscope," Optica vol. 2, No. 2, Feb. 2015, pp. 104-111.

Tomer et al., "Advanced Clarity for rapid and high-resolution imaging of intact tissues," Nat. Protoc., vol. 9, No. 7, Jul. 2014, pp. 1682-1697.

Wade, et al., "A fast, robust pattern recognition system for low light level image registration and its application to retinal imaging," Optics Express vol. 3, No. 5, Aug. 31, 1998, pp. 190-197.

Williams, D., "Imaging Single Cells in the Living Retina," Vis. Res. 51, pp. 1379-1396 (Jul. 1, 2011).

Yaroslavsky, "Image Resampling and Building Continuous Image Models", Chapter 6, Theoretical Foundations of Digital Imaging Using MATLAB , pp. 293-342 (CRC Press, 1 edition, Nov. 26, 2012).

Yuan, et al., "Image deblurring with blurred/noisy image pairs," ACM Trans. Graph. 26, Jul. 29, 2007, pp. 1-10.

Zhou, et al., "What are Good Apertures for Defocus Deblurring?" in 2009 IEEE International Conference on Computational Photography (IEEE, Apr. 16-17, 2009), pp. 1-8.

U.S. Appl. No. 16/572,497, filed Sep. 16, 2019, Ou et al.

Chinese Second Office Action dated Dec. 31, 2019 issued in CN 201580072950.8.

U.S. Notice of Allowance dated Jan. 29, 2020 issued in U.S. Appl. No. 14/065,280.

U.S. Office Action dated Jan. 9, 2020 in U.S. Appl. No. 14/658,019.

US Notice of Allowance dated Feb. 18, 2020 issued in U.S. Appl. No. 16/242,934.

U.S. Notice of Allowance dated Dec. 9, 2019 in U.S. Appl. No. 16/162,271.

U.S. Notice of Allowance dated Mar. 2, 2020 in U.S. Appl. No. 14/797,154.

U.S. Notice of Allowance dated Jan. 17, 2020 issued in U.S. Appl. No. 15/003,559.

U.S. Notice of Allowance dated Jan. 24, 2020 issued in U.S. Appl. No. 15/068,389.

\* cited by examiner

MULTIPLEXED FOURIER PTYCHOGRAPHY IMAGING SYSTEMS AND METHODS

CROSS-REFERENCES TO RELATED APPLICATIONS

This application is a continuation-in-part application of U.S. patent application Ser. No. 14/065,280 titled "FOURIER PTYCHOGRAPHIC IMAGING SYSTEMS, DEVICES, AND METHODS" and filed on Oct. 28, 2013, which claims priority to both U.S. Provisional Patent Application No. 61/720,258, titled "Breaking the Spatial Product Barrier via Non-Interferometric Aperture-Sythesizing Microscopy (NAM)," filed on Oct. 30, 2012 and to U.S. Provisional Patent Application No. 61/847,472 titled "Fourier Ptychographic Microscopy," filed on Jul. 17, 2013; all of which are hereby incorporated by reference in their entirety and for all purposes. This application is also a non-provisional application of and claiming priority to U.S. Provisional Patent Application No. 62/087,633, titled "Hadamard multiplexed Fourier ptychography" and filed on Dec. 4, 2014, which is hereby incorporated by reference in its entirety and for all purposes.

FEDERALLY SPONSORED RESEARCH OR DEVELOPMENT

This invention was made with government support under Grant No. OD007307 awarded by the National Institutes of Health. The government has certain rights in the invention.

BACKGROUND

Certain embodiments described herein are generally related to digital imaging, and more specifically, to Multiplexed Fourier Ptychographic imaging systems and their components, and Multiplexed Fourier Ptychographic imaging methods.

Ptychography imaging involves collecting lower resolution intensity images and reconstructing them into a higher resolution image. Over the past two decades, ptychographic imaging has been used in a variety of regimes to produce high-resolution, wide field-of-view images of microscopic and nanoscopic phenomena. Whether in the X-ray regime at third-generation synchrotron sources, in the electron microscope for atomic scale phenomena, or in the in the optical regime for biological samples, ptychography has shown an unparalleled ability to acquire hundreds of megapixels of sample information near the diffraction limit. Typically, the underlying operation of ptychography is to sample a series of diffraction patterns from a sample as it is scanned through a focused beam. These intensity-only measurements are then reconstructed into a complex (i.e. amplitude and phase), high-resolution image with more pixels of sample information than any single recorded diffraction pattern.

Recently, a Fourier ptychographic imaging technique was introduced that constructs a high-resolution sample complex, high-resolution image from a series of low-resolution intensity measurements captured while the sample of interest is sequentially illuminated from different incidence angles. In one particular implementation, a Fourier ptychographic microscopy (FPM) system uses an array of light emitting diodes (LEDs) located beneath, a thin, semi-transparent sample of interest. Each LED approximates a point illumination source. During image acquisition, the FPM system sequentially turns on individual LEDs to provide illumination incident to the sample from different angles. The light from each LED passes through the thin sample and to an imaging lens (e.g., a conventional microscope objective). The light detector receives diffraction patterns from the imaging lens and captures intensity measurements to form a unique lower resolution image for each incidence angle. The set of lower resolution images acquired during sequential illumination by different incidence angles can be reconstructed into a high-resolution complex measurement through a phase-retrieval operation. An example of this standard Fourier ptychographic imaging technique and an FPM system that implements this technique can be found in Zheng, Guoan, Horstmeyer, Roarke, and Yang, Changhuei, "Wide-field, high-resolution Fourier ptychographic microscopy," Nature Photonics vol. 7, pp. 739-745 (2013) and in U.S. patent application Ser. No. 14/065,280, titled "Fourier Ptychographic Imaging Systems, Devices, and Methods" and filed on Oct. 28, 2013; which are hereby incorporated by reference in their entirety and for all purposes.

SUMMARY

Certain embodiments pertain to digital imaging, and more specifically, to Multiplexed Fourier Ptychographic imaging systems and their components, and Multiplexed Fourier Ptychographic imaging methods.

Certain embodiments pertain to a multiplexed Fourier Ptychographic imaging system. The system comprises an LED array configured to illuminate a sequence of LED patterns, the LED array located to illuminate a sample being imaged. The system further comprises LED circuitry in electrical communication with the LED array, wherein the LED circuitry is configured to independently control power to turn on multiple LEDs simultaneously in each LED pattern. The system further comprises a lens configured to collect light issuing from the illuminated sample. The system further comprises a light detector configured to receive light from the lens to acquire a first set of lower resolution images associated with the sequence of LED patterns, wherein each lower resolution image is based on light received during an exposure time. The system further comprises a processor configured to use the first set of lower resolution images to generate a second set of lower resolution images associated with each LED in the LED array and to iteratively update overlapping regions in the Fourier domain with the second set of lower resolution images to generate a higher resolution image.

Certain embodiments pertain to an LED array assembly in a multiplexed Fourier Ptychographic imaging system. The LED array assembly generally comprises an LED array and LED circuitry in electrical communication with the LED array. The LED array is configured to illuminate a sequence of LED patterns, the LED array located to illuminate a sample being imaged. The LED circuitry is configured to independently control power to turn on multiple LEDs simultaneously in each LED pattern.

Certain embodiments pertain to a multiplexing Fourier Ptychographic imaging method. The method comprises multiplexed illuminating of a sample by a sequence of LED patterns. The method collects light issuing from the illuminated sample using a lens. The method acquires a first set of low resolution images of the sample using a light detector receiving light from the lens. Each low resolution image captured during an exposure time while one of the LED patterns is illuminated. The method generates a second set of low resolution images of the sample using the first set. Each low resolution image of the second set of images is associated with a single LED in the LED patterns. The method reconstructs a higher resolution image of the sample by iteratively updating overlapping regions in Fourier space with the second set of low resolution images.

These and other features are described in more detail below with reference to the associated drawings.

DETAILED DESCRIPTION

Figure 1:
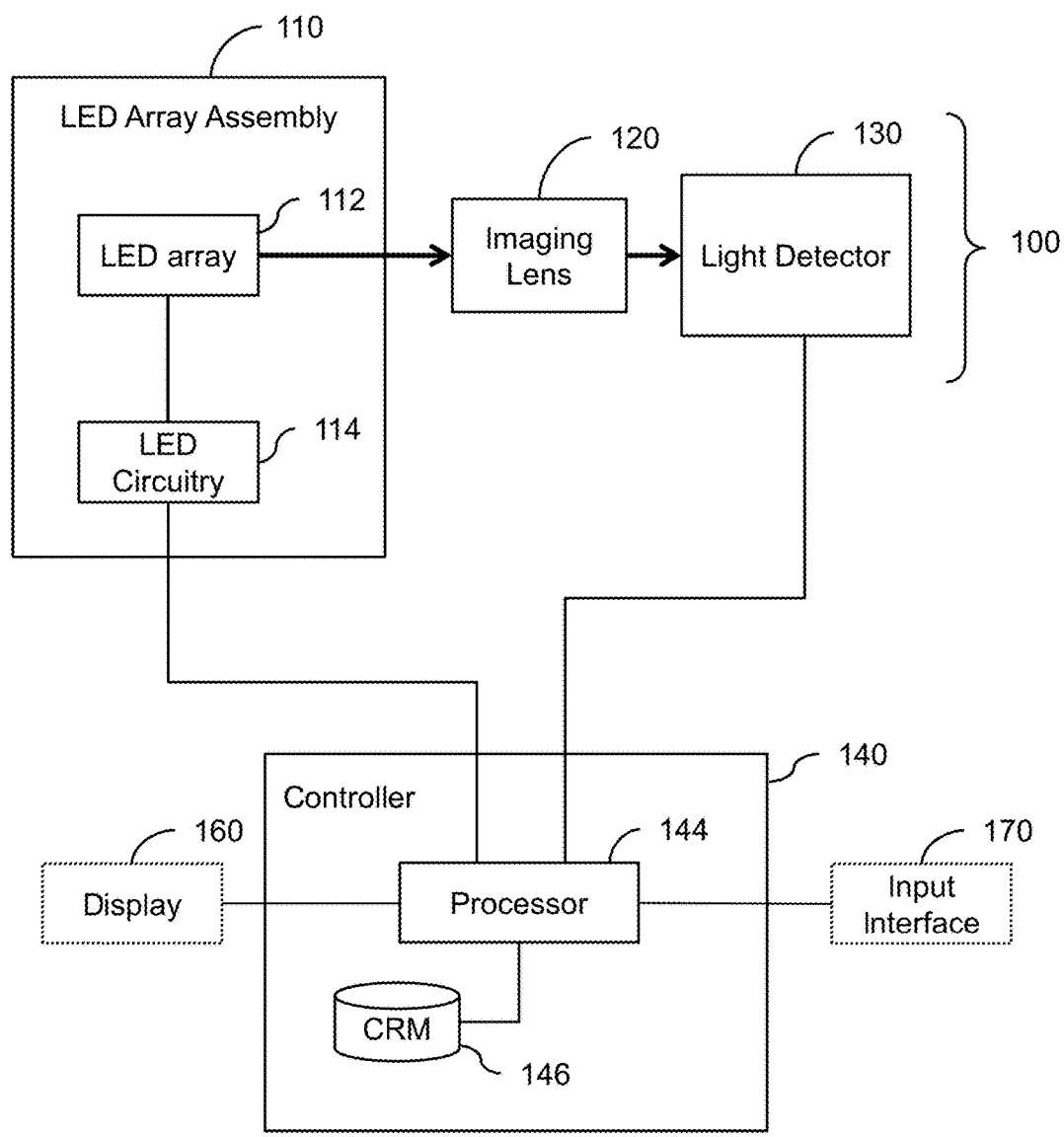
FIG. 1 is a block diagram of components of a Multiplexed Fourier ptychographic imaging system, according to embodiments.

Embodiments of the present invention will be described below with reference to the accompanying drawings. The features illustrated in the drawings may not be to scale.

Certain embodiments pertain to multiplexed Fourier Ptychographic imaging systems, system components, and methods. In certain aspects, a multiplexed Fourier Ptychographic imaging system comprises an LED array assembly with circuitry connected to an LED array for independently controlling power to turn on multiple LEDs simultaneously in each pattern of a sequence of LED patterns for multiplexed illumination of a sample. The system further comprises a processor in communication with the LED circuitry and in communication with a light detector. The system determines the sequence of LED patterns and exposure time to use during each cycle and sends control signals to control the turning on of the individual LEDs to illuminate the LED patterns during image acquisition. The system further comprises an imaging lens (e.g. objective lens) located to receive light issuing from the illuminated sample. The system comprises a light detector positioned to receive diffraction patterns transferred from the imaging lens based on light issuing from the illuminated sample. The light detector receives photons and takes intensity measurements for an exposure time during illumination by each LED pattern to acquire a single lower resolution image. The processor sends control signals to the light detector to control image acquisition by the light detector based on the determined exposure time. During each cycle, the light detector acquires a first set of lower resolution images while the sample is illuminated by the sequence of LED patterns. Using the first set of lower resolution images, the system generates a second set of lower resolution images and this second set of lower resolution images is used to generate a higher resolution image.

During each cycle, the system determines a sequence of LED patterns and an exposure time to use during the cycle. Multiple LEDs of each pattern are turned on simultaneously in the LED array to illuminate the sample during each image acquisition. The imaging lens receives light issuing from the sample and the light detector received light transferred from the imaging lens. To acquire each image, the light detector receives photons and samples intensity measurements for an exposure time while a single LED pattern is illuminated. During each process cycle, the light detector acquires a first set of lower resolution images during illumination by a sequence of LED patterns. In some cases, the processor determines the LED patterns and exposure time based on a maximum processing time and/or minimum signal-to-noise ratio (SNR). For example, an operator may provide tuning input with one or more of a maximum processing time and a minimum SNR. In one case, the processor can determine an exposure time that will keep the total processing time during the cycle below the maximum processing time and/or LED patterns that will cause the images acquired to have an SNR above the minimum SNR. After capturing the first set of lower resolution images, a weighted sum operation of the first image data set is performed to re-create a second image data set that would have been captured had a single LED been turned on at each image acquisition time. After this weighted sum operation, a high resolution amplitude and phase map of the image sample can be reconstructed based on the second data set. Details of reconstruction processes that can be used are found in Section III, in Zheng, Guoan, Horstmeyer, Roarke, and Yang, Changhuei, "Wide-field, high-resolution Fourier ptychographic microscopy," Nature Photonics, vol. 7, pp. 739-745 (2013), and in U.S. patent application Ser. No. 14/065,280, titled "Fourier Ptychographic Imaging Systems, Devices, and Methods" and filed on Oct. 28, 2013.

Data capture for standard Fourier ptychography imaging techniques is generally performed by illuminating one LED at a time from within a large array of N LEDs, and acquiring a digital image for each illuminated LED based on a specific incidence angle. Where N may be several hundred LEDs, the data capture process can be time consuming. For example, a standard Fourier ptychography imaging system that uses 225 LEDs to take 225 images with a 1 second exposure time would have total image acquisition time of 225 seconds.

Instead of turning on a single LED for each image acquired, a multiplexed Fourier Ptychographic imaging system of embodiments uses multiplexed illumination. The system is designed with an LED array assembly that can turn on any LED in the LED array to turn on unique patterns of a sequence of LED patterns. In one example, the LED patterns may have up to ½ or ¾ of the total number of LEDs for each image. After capturing N different images, each under illumination from a unique pattern, it is possible to linearly combine the resulting images to generate a second data set that would have captured had individual LEDs been illuminated in the array. Since, however, each image is illuminated with light that much brighter than when using just a single LED, a much shorter exposure time per image can be used resulting in a much faster data acquisition process.

In certain aspects, multiplexed Fourier Ptychographic imaging systems and methods are configured to improve the rate at which high resolution images are generated since the exposure time can be reduced significantly for the same noise. As discussed above, certain standard Fourier Ptychographic imaging techniques are based on turning on a single LED at each acquisition time to illuminate the sample from a single incidence angle. The multiplexed Fourier Ptychographic imaging technique turns on multiple LEDs simultaneously in a unique pattern during each image acquisition. In order to provide patterned illumination, the multiplexed Fourier Ptychographic imaging system includes an LED array assembly with circuitry and processor designed for independent control of each LED in the array so that any of the LEDs can be turned on simultaneously to illuminate unique patterns. Since each low-resolution image is based on significantly more photons received at the light detector, the noise is reduced for each image acquired. Since this is the case, the multiplexed Fourier Ptychographic imaging system can reduce the exposure time significantly while maintaining the same noise. Reducing the exposure time at each image acquisition reduces the overall processing time. The amount of noise is based on the number of LEDs illuminated in each pattern. In some aspects, the system is tunable to adjust the processing time by selecting a particular exposure time and/or to adjust the SNR by selecting a particular sequence of LED patterns. For example, an operator of the system can provide tuning input to keep the processing time below a processing time provided by the operator and also keep the noise below a particular level associated with an SNR. For example, a multiplexed Fourier ptychography imaging system that uses 225 LEDs to take 225 images can simultaneously turn on 113 of the 225 LEDs for each unique pattern during image acquisition. While maintaining the same amount of noise, exposure time can be reduced by a factor of sqrt (225)/2=7.5. That is, if the original exposure time is 1 second per acquisition using 1 LED illuminated at each acquisition, the new exposure time used by the multiplexed Fourier Ptychographic imaging system can be reduced to 1/7.5=0.13 seconds while maintaining the same noise. In this case, the total image acquisition time can be reduced from 225 to 225*0.13 seconds=30 seconds.

I. Multiplexed Fourier Ptychographic Imaging Systems

FIG. 1 is a block diagram of components of a Multiplexed Fourier ptychographic imaging system 10, according to embodiments. The system 10 includes an image collection assembly 100 comprising an LED array assembly 110, an imaging lens 120, and a light detector 130 for taking intensity measurements. The LED array assembly 110 comprises an LED array 112 configured to illuminate a sample (not shown) being imaged and circuitry 114. The system 10 also includes a controller 140 having a processor 144 and a CRM (i.e. computer readable medium) 146, an optional (depicted by dotted line) display 160, and an optional (depicted by dotted line) input interface 170. The LED circuitry 114 is in electrical communication with the LED array 112 and the processor 144 of the controller 140. The LED circuitry 114 is configured to provide power to independently turn on each LED in the LED array 112. The processor 144 determines the sequence of LED patterns and sends control signals through the circuitry 114 to the LED array 112 illuminate the sequence of LED patterns. The arrow between the LED array 112 and imaging lens 120 depicts that the imaging lens 120 is located to receive light issuing from the sample illuminated by coherent light from the LED array 112. The arrow between the imaging lens 120 and the light detector 130 depicts that the light detector 130 is configured to receive light issuing from the sample as transferred from the imaging lens 120. The light detector 130 sequentially captures a first set of lower resolution images of the sample illuminated by the sequence LED patterns where each low-resolution image is based on intensity measurements taken over an exposure time. As used herein, an exposure time generally refers to a duration of time during which a light detector collects photons, integrates the total energy from the collected photons into an electric potential, and uses this potential as a measure of intensity at each discrete light detecting element (e.g., pixel) to form the image data that comprises a single lower resolution image.

The Multiplexed Fourier ptychographic imaging system 10 includes a processor 144 and a CRM 146, an optional display 160, and an input interface 170. In one example, one or more of these components may be part of a single computing device such as, for example, a smartphone, laptop, desktop, tablet, etc. The optional display 160, optional input interface 170, and CRM 146 are all in communication with the processor 144. The processor 144 of controller 140 determines the sequence of LED patterns and exposure time to use during image acquisition and also generates a high-resolution image from the intensity data of the first set of lower resolution images acquired by the light detector 130. The processor 144 is also in communication with the light detector 130 and the LED circuitry 114 to send a control signals to synchronize the illumination of the LED patterns with the exposure times for acquiring the first set of lower resolution images with the illumination times of the sequence of LED patterns. That is, the processor 144 sends control signals to the LED array 112 through the LED circuitry 114 with instructions to illuminate the sequence of LED patterns. The processor 144 sends control signals to the light detector 130 to receive photons for exposure times while the LED array is illuminated by the sequence LED patterns.

Figure 2:
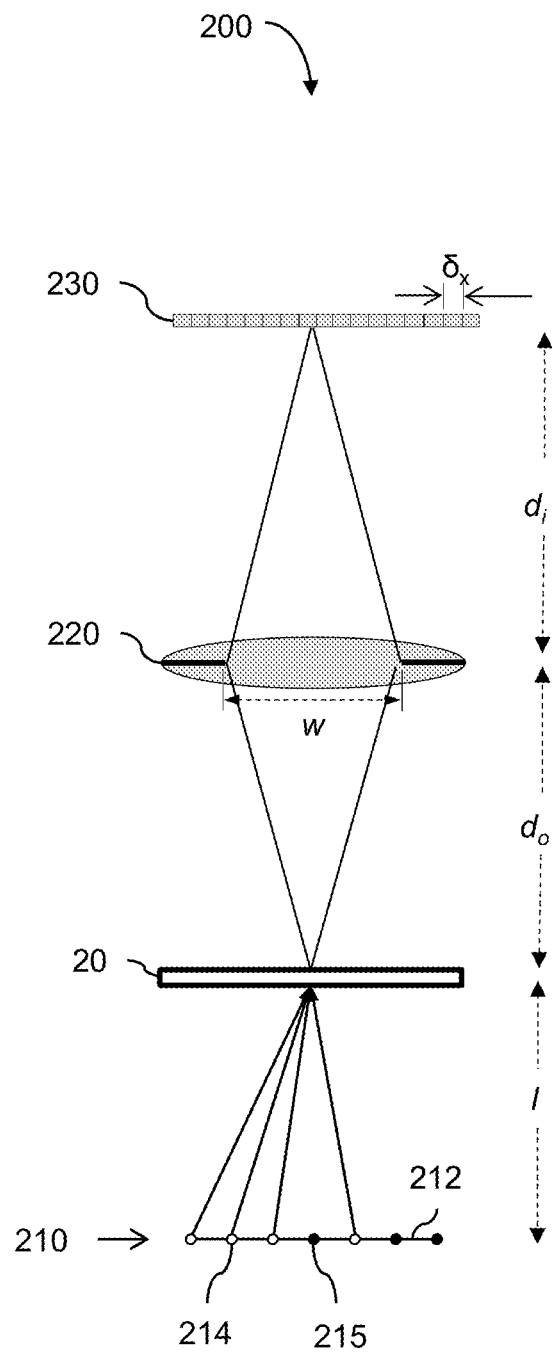
FIG. 2 is a schematic drawing of a side view of an image collection assembly, according to an embodiment.
Figure 3:
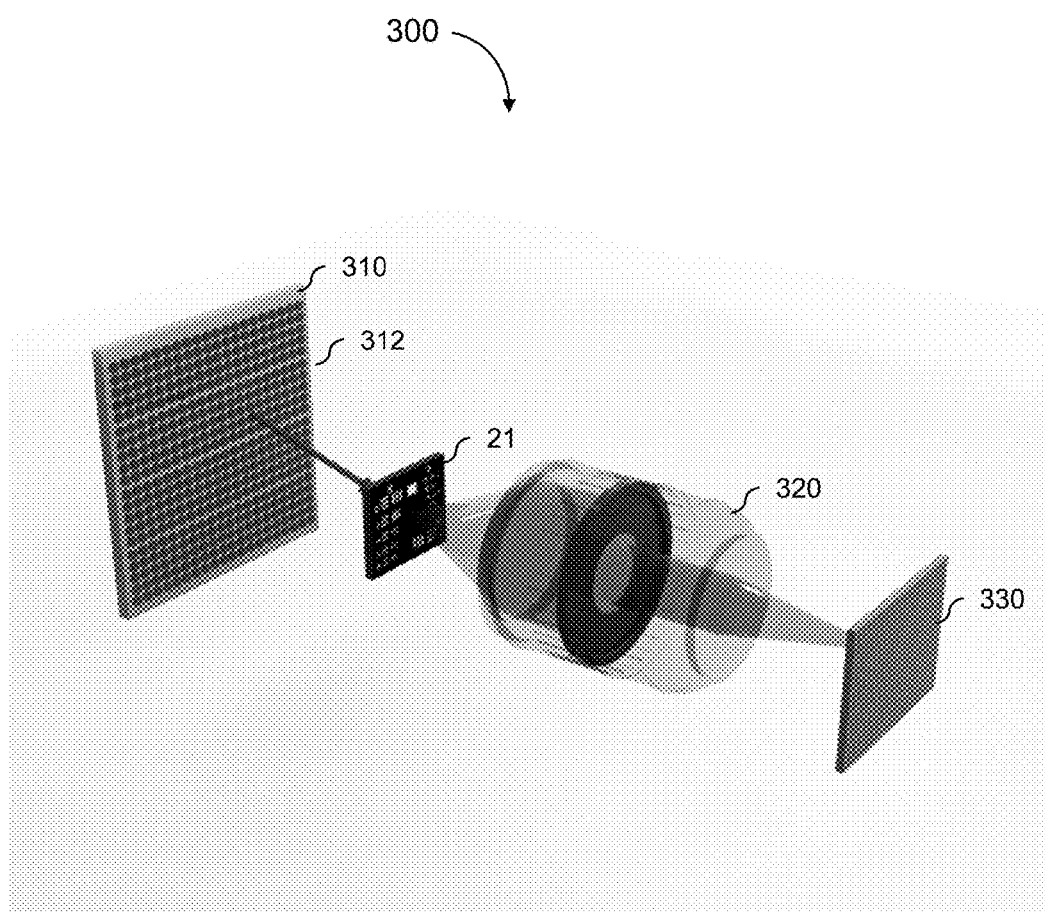
FIG. 3 is a schematic drawing of a perspective view of an image collection assembly, according to an embodiment.

FIGS. 2 and 3 are schematic drawings of components of image collections assemblies that may be used in a Multiplexed Fourier ptychographic imaging system such as the system shown in FIG. 1. FIG. 2 is a schematic drawing of a side view of an image collection assembly 200, according to an embodiment. The image collection assembly 200 comprises an LED array assembly 210 with an LED array 212 located to illuminate a sample 20, an imaging lens 220, and a light detector 230 for measuring intensity from photons received at its active sensing surface. In this example, the image collection assembly 200 is arranged in trans-illumination mode directing illumination through the sample being imaged while the imaging lens 220 receives light transmitted through the sample 21. In this illustrated example, the LED array 212 is one-dimensional LED array with seven LEDs. In this illustration, an LED pattern is shown with four illuminated LEDs 214 and three non-illuminated LEDs 215. During image acquisition, the LEDs receive control instructions though circuitry (not shown) from a controller (not shown) and execute the control instructions to illuminate a sequence of LED patterns. The system 200 further comprises an imaging lens 220 that receives and accepts light based on its NA issuing from the illuminated sample 20. In certain cases, the imaging lens 220 is located at a Fourier plane of the sample plane. The light detector 230 receives illumination transferred from the imaging lens 220 and measures intensity data for an exposure time to capture each low-resolution image. During an image acquisition operation, the light detector 230 measures intensity data to acquire a first set of lower resolution images while the sample 20 is illuminated by a sequence of illuminated LED patterns.

FIG. 3 is a schematic drawing of a perspective view of an image collection assembly 300, according to an embodiment. The image collection assembly 200 comprises an LED array assembly 310 with an LED array 312 configured to illuminate a sample 22, an imaging lens 320 (e.g. objective lens), and a light detector 330. The LED array 312 is a two-dimensional LED array (20×20) with 400 LEDs. An arrow is depicted showing the angle of illumination of a particular LED in the array 312. During operation, the LEDs receive control instructions though circuitry (not shown) from a controller (not shown) and execute the control instructions to illuminate a sequence of LED patterns. The imaging lens 320 receives and accepts light based on its NA issuing from the illuminated sample 21. In certain cases, the imaging lens 320 is located at a Fourier plane of the sample plane. The light detector 330 receives illumination transferred from the imaging lens 320 and measures intensity data for an exposure time to capture each low-resolution image. During an image acquisition operation, the light detector 330 measures intensity data for a sequence of lower resolution images while the sample 21 is illuminated by a sequence of illuminated LED patterns.

According to certain aspects, the components of the image collection assembly may be arranged to operate in either trans-illumination mode (i.e. imaging lens collecting light transmitted through the sample) or in reflective mode (i.e. light reflected from the sample is collected at the imaging lens). In FIG. 2, for example, the components of the image collection assembly 200 are arranged to operate in trans-illumination mode where the LED array 212 and imaging lens 220 are located to direct illumination through the sample 20 while the imaging lens 220 receives light transmitted through the sample 20. To operate in reflection mode, the LED array and imaging lens would be located to direct illumination toward the sample and the imaging lens located to receive light reflected from the sample.

During a typical cycle of a Multiplexed Fourier ptychographic imaging system, a processor determines a sequence of LED patterns to illuminate during image acquisition by the light detector. The processor also determines an exposure time for the light detector to receive photons and measure intensity values for each image acquisition. The processor sends control signals to both the light detector and to the LED array with control data to synchronize the illumination of each LED pattern with image acquisition. The processor may send control data comprising, for example, one or more of a start time for the image acquisition operation, the determined exposure time for each image acquisition and corresponding duration of illumination of each LED pattern, and the number of images acquired, and data for illuminating the determined sequence of LED patterns. During image acquisition, the processor independently controls through the circuitry each LED in the LED array to turn on LEDs in the sequence of LED patterns. The imaging lens receives light issuing from the sample and transfers light to the light detector. The light detector receives photons and samples intensity measurements during the determined exposure time while each LED pattern is illuminated. During the image acquisition process of each cycle, the light detector sequentially captures a first set of lower resolution images of the sample while the sample is being illuminated by the determined sequence of LED patterns. The processor performs a weighted sum operation on the first image data set to re-create a second image data set that would have been captured had a single LED been turned on at each image acquisition time. The processor reconstructs a high resolution amplitude and phase map of the image sample using the second image data set.

Generally, a sample can comprise one or more objects of interest. For example, a sample may be a biological specimen with one or more cells or cell organelles. As another example, the sample may be a semiconductor wafer. In some cases, the one or more objects in the sample are thin and/or translucent.

In certain aspects, the Multiplexed Fourier ptychographic imaging system comprises an LED array assembly comprising an LED array and LED circuitry. The LED circuitry provides electrical communication between each LED in the LED array and a processor, for example, of a controller. That is, the processor is electrically connected through the LED circuitry to the LED array to be able to send control signal(s) to turn on LEDs of each LED pattern in the sequence of LED patterns.

The LED array assembly comprises an LED array with n×m dimensions for providing illumination. The LED array can be a one-dimensional array (1×m where n=1) or a two-dimensional array of discrete LEDs. Some examples of dimensions of the LED array are 6×6, 7×7, 8×8, 9×9, 10×10, 32×32, 50×50, 20×20, 30×30, 60×60, 100×100, 50×10, 20×60, 1×10, 1×7, 1×20, 1×30, etc. Other dimensions may be used. Each LED in the LED array can be approximated as a point light emitter. Although, the LED array is described in many cases as a single LED at each location of the array, each location may have multiple LEDs in some cases. For example, each location in the array may have blue, green, and red LEDs. In some cases, the LEDs provide visible light wavelengths. In other cases, the LEDs provide ultraviolet light wavelengths. In other cases, the LEDs provide infrared light wavelengths.

In certain aspects, a Multiplexed Fourier ptychographic imaging system comprises an LED array assembly with LED circuitry that can provide power (e.g., voltage) to any combination of LEDs in the LED array simultaneously, without needing to vary the power delivered to each LED over time while it is in the "on" state. In other words, the LED circuitry can simultaneously provide a constant power (i.e., voltage) to any and all LEDs within the array that must be in the "on" state. That is, the LED circuitry is designed to allow for independent control of turning on/off any combination of LEDs in the array simultaneously. In one example, the LED circuitry includes an electrical connection (e.g. wire) between each LED and the processor.

Figure 4:
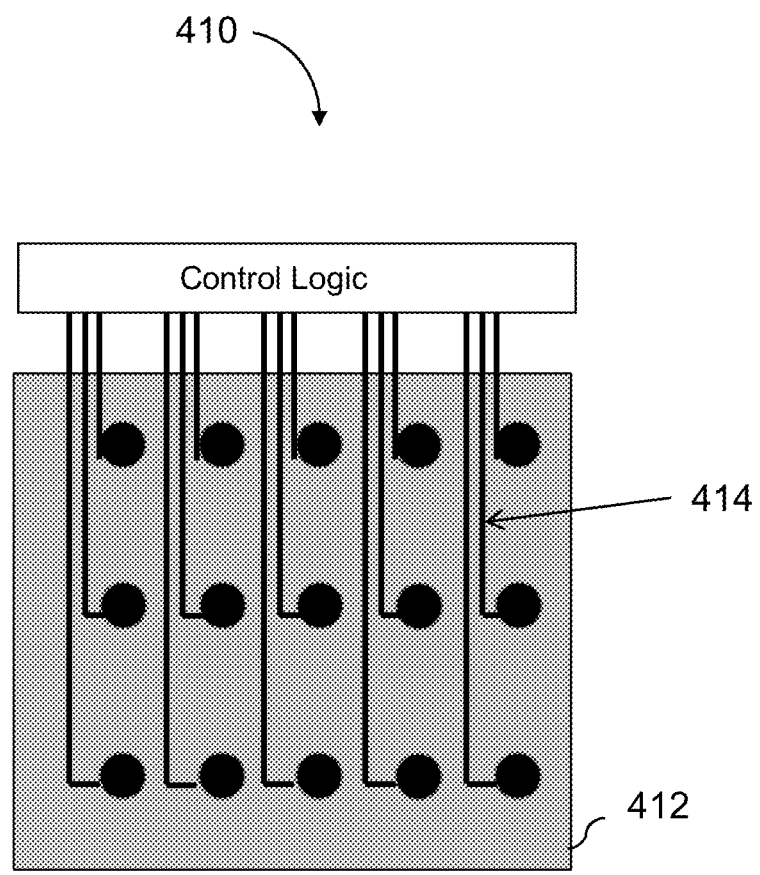
FIG. 4 is a schematic drawing of an LED array assembly with LED circuitry that can provide constant power simultaneously to any and all LEDs within the LED array, according to an embodiment.

FIG. 4 is a schematic drawing of an LED array assembly 410 with LED circuitry 412 that can simultaneously provide a constant power (i.e., voltage) to any and all LEDs within the LED array that must be in the "on" state, according to an embodiment. The LED array assembly 410 comprises a 3×5 LED array 412 and individually addressed LED circuitry 414. The arrow indicating LED circuitry 414 points to a single wire in the LED circuitry 414 but it would be understood that there are 15 wires in this illustrated LED circuitry 414. As shown, the LED circuitry 414 includes a single wire between each LED in the array 412 and the control logic of the controller (e.g., microcontroller). Single wires provide the ability to control DC voltage/current to each LED individually. That is, the LED array 412 is an individually addressed array.

Conventional LED arrays are typically designed with electrical connections to turn on a single LED at a time where each LED is controlled by setting values to its associated row and column. Such LED arrays are often referred to as multiplexed displays. A related form of display is often referred to as a charlieplexed display. For example, in one conventional LED array, often referred to as a dot-matrix display with a dot-matrix controller, the rows are connected to LED anodes of a microcontroller and the columns are connected to LED cathodes of the microcontroller. To turn on any of the LEDs in a column, the column needs to be on a low setting (i.e., a low voltage). To turn on any of the LEDs in a row, the rows needs to be in the high setting (i.e., a high current). If the row and column are both set to high or both set to low, no voltage flows through the LED and it does not turn on. To control an individual LED, the column is set to low and the row too high. To control multiple LEDs in a row, the row is set to high then the columns are set to low or high as appropriate to turn on respective LEDs over time. This conventional LED array does not have the ability to turn on an arbitrary group of LEDs simultaneously, since they do not have independent control of each LED. That is, the control of an LED is dependent on the row and column setting and not an individual LED. For example, this conventional LED array would not be capable of turning on LEDs along a diagonal of the array, since this will require all of the rows to be set to a low voltage and all of the columns to be set to a high voltage in our example, which will cause all of the LEDs in the array to turn on, instead of just the LEDs along the diagonal, as desired.

Figure 5:
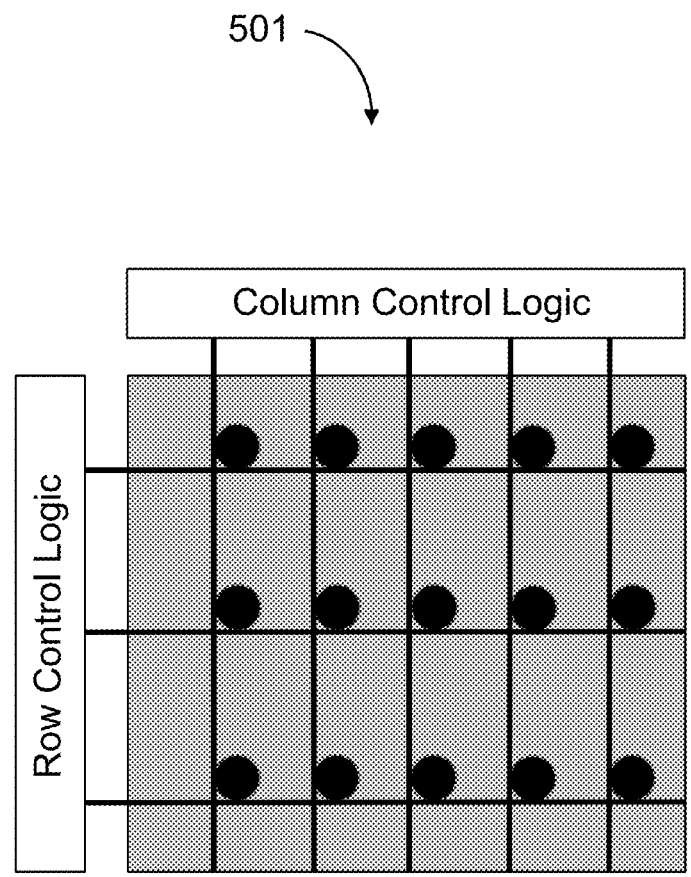
FIG. 5 is a schematic drawing of a LED array assembly, according to an embodiment.

FIG. 5 is a schematic drawing of an LED array assembly 501 with a 3×5 row/column addressed LED array. In this example, the circuitry is designed to control the DC voltage/current only along the entire row/column.

Since conventional LED arrays (e.g., dot-matrix displays or charlieplexed displays) cannot turn on any group of LEDs in the LED array, they often turn on each LED in the desired pattern individually and very quickly (i.e., within less than 30 milliseconds, which is the approximate integration time of the human eye). While this is helpful for displaying content in the LED display to a user, it is not helpful for delivering a constant amount of optical power over time from each LED to evenly illuminate, e.g., a specimen for multiplexed illumination.

In certain aspects, a Multiplexed Fourier ptychographic imaging system comprises an imaging lens for collecting light issuing from the sample. Typically, the imaging lens is located at a Fourier plane of the sample plane. The imaging lens may be, for example, an objective lens that only accepts light within a range of incidence angles based on its numerical aperture (NA). In one case, the imaging lens is an objective lens with an NA of about 0.08. In another case, the imaging lens is an objective lens with an NA in the range between about 0.01 and about 0.1.

In certain aspects, the Multiplexed Fourier ptychographic imaging system comprises a light detector having a two-dimensional grid of equally spaced discrete detecting elements (e.g., pixels). During each exposure time, the light detector collects photons, integrates the total energy from the collected photons into an electric potential, and uses this potential as a measure of intensity at each discrete light detecting element (e.g., pixel) to form the image data that comprises a single lower resolution image. The light detector generates a signal(s) with lower resolution images of image data of the intensity distribution measured by the grid of discrete light detecting elements during the cycle. If visible light radiation is being used to illuminate the sample, the light detector may be in the form of a charge coupled device (CCD), a CMOS imaging sensor, an avalanche photo-diode (APD) array, a photo-diode (PD) array, a photomultiplier tube (PMT) array, or like device. If using THz radiation is used, the light detector may be, for example, an imaging bolometer. If X-ray radiation is used, the light detector may be, for example, an x-ray sensitive CCD. These examples of light detectors and others are commercially available. In some aspects, the light detector may be a color detector e.g., an RGB detector. In other aspects, the light detector may be a monochromatic detector.

In certain aspects, a Multiplexed Fourier ptychographic imaging system comprises one or more processor (e.g., microprocessors) that receives instructions stored on a CRM and executes the instructions to perform one or more functions of the system. For example, the processor may execute instructions stored on the CRM to perform one or more of: 1) interpreting image data, 2) reconstructing a higher resolution image, 3) generating a second set of lower resolution image data from a first set of lower resolution image data, 4) providing display data for displaying one or more images or other output on the display, and 5) determining a sequence of LED patterns, an exposure time, control instructions for turning on LEDs in the form of LED patterns in the LED array, and/or other operations performed during one or more operations of the Multiplexed Fourier ptychographic imaging method described in Section II. The processor may be connected directly or indirectly through other devices to one or more power supplies. The one or more power supplies may be internal and/or external to the system.

In certain aspects, a Multiplexed Fourier ptychographic imaging system comprises a processor that send control signals to the LED array and/or the light detector. In some cases, these control signals synchronize the illumination of the sequence of LED patterns with the exposure times for acquiring the first set of lower resolution images. For example, the processor may send control signals to the LED array through the LED circuitry with instructions to illuminate the sequence of LED patterns and control signals to the light detector to receive photons for exposure times while the LED array is illuminated by the sequence LED patterns. The processor may also determine the sequence of LED patterns and exposure time to use during image acquisition and/or generate a high-resolution image from the first set of lower resolution images acquired by the light detector.

In certain cases, a processor can send control signals through LED circuitry to the LED array to illuminate a sequence of LED patterns. In these cases, the controller can independently control any combination of LEDs in the LED array to turn on the LEDs of each LED pattern of the sequence. The processor can also generate a high resolution image from the first of lower resolution images collected during illumination by the sequence of LED patterns. The controller may also provide display data to a display and/or may process signals with input from an input interface.

In certain aspects, a Multiplexed Fourier ptychographic imaging system comprises a CRM (e.g., memory) is in communication with one or more processors to receive data and sending data stored on the CRM. In addition to storing instructions for performing certain functions of the system, the CRM can also store lower resolution image data (first set and/or second set), higher resolution image data, input from an operator or other entity, and other data used by the system. For example, the CRM may store different sequences of LED patterns and exposure times that correspond to certain SNR levels and/or processing times. In other cases, the CRM may store instructions for calculating a sequence of LED patterns and/or an exposure time based on a particular processing time and/or a particular SNR. Alternatively, for example in the case of using Hadamard multiplexing, the CRM may store a look-up table. This look-up table may contain a list of possible number of images to acquire, ranging from 1 to N, where N can be as large as 1000 or more. For each value of N, the look-up table will contain a unique list of N different LED patterns (i.e., a list of which LEDs to turn on within the LED array and which should remain off, for each image to be captured). The look-up table might also contain a list of exposure times for each image to be captured.

In some aspects, a Multiplexed Fourier ptychographic imaging system comprises a display in communication with the processor to receive data for displaying images and other output on the display to, for example, an operator of the system. The display may be a color display or a black and white display. In addition, the display may be a two-dimensional display or a three-dimensional display. In one embodiment, the display may be capable of displaying multiple views.

In some aspects, a Multiplexed Fourier ptychographic imaging system comprises an input interface. The input interface refers to a device capable of receiving input from an operator of the system. For example, an input interface may be a keyboard, a touch screen, a microphone, etc.

A. Sequence of LED Patterns

In certain aspects, the multiplexed Fourier Ptychographic imaging system uses an LED array assembly to turn on multiple LEDs in the LED array in a sequence of LED patterns. During illumination by each LED pattern, the system captures a lower-resolution image. Although LED patterns are described in certain examples herein with respect to a square LED array having N LEDs (N=n×n), other LED arrays may be used.

By illuminating patterns of LEDs during each cycle, a Multiplexed Fourier ptychographic imaging system can speed up image acquisition significantly from conventional techniques by reducing exposure time while maintaining the same SNR within each image acquired. When using a square LED array, for example, the exposure time of each image acquisition (and the total duration of the image acquisition process) can be reduced by up to a factor of approximately sqrt(N)/2 for a fixed SNR within each image acquired, where again N is the number of LEDs in the array and sqrt( ) denotes a square root operation. From the theory of Hadamard multiplexing, the exact exposure reduction is [sqrt(N)+(1/sqrt(N))]/2, which approaches the above approximation for large N, and assumes the predominant source of noise effecting the SNR is statistically independent and additive. Put another way, if the system can use the same image exposure time as would have been used when turning on a single LED, then the SNR of each detected image will be improved by the same sqrt(N)/2 factor when multiplexing is used and when the noise is independent and additive. In some aspects, the system can take advantage of this flexibility by adjusting the exposure time and LED patterns to tune the system to a particular processing time and SNR combination. After data capture of a first set of N images using the illuminated LEDs arranged in patterns, the system performs a weighted sum of the N images to produce a second set of images that is analogous to what is captured when a single LED is on at each acquisition time.

Generally, the sequence of LED patterns comprises unique patterns. In most cases, each LED pattern comprises at least one LED turned on at a time. In one aspect, each LED pattern comprises less than or equal to 3N/4 LEDs turned on at a time. In one aspect, each LED pattern turns on up to half of the LEDs in the array during each image acquisition. In the case of a square LED array, each LED pattern turns on up to N/2 of the LEDs in the array for each image. In another aspect, each LED pattern turns on up to a quarter of the LEDs in the array for each image acquired. In the case of a square LED array, each LED pattern turns on up to N/4 of the LEDs in the array for each image. In another aspect, each LED pattern turns on more than a quarter of the LEDs in the array for each image acquired. In another aspect, each LED pattern turns on more than a quarter of the LEDs in the array for each image acquired. Typically, multiplexing requires that more than 1 LED is turned on at a time. In one example, a LED pattern has less than or equal to 3N/4 LEDs turned on at a time.

In some cases, the number of unique patterns in the sequence is determined by the number of LEDs that will be illuminated in the LED array or the number of images that will be acquired. In one example that uses a square (n×n) LED array, the number of unique patterns in the sequence is N (N=n×n). The number of unique patterns in the sequence is N and the sequence of LED patterns together form an N×N matrix, which can be stored and accessed appropriately as a look-up table for selecting the correct set of patterns for a given value of N. It is possible that the number of unique patterns may also be less than N, when using modified versions of the Hadamard code are used (i.e., which might take into account uneven illumination at the sample plane, LED sources that do not turn completely off, or LED sources that offer a coupled output).

In one aspect, the LED patterns in the sequence are defined by a "Hadamard" pattern also referred to as "Hadamard" code. In the case of a one-dimensional LED array (n×1), the number of unique patterns in the sequence is n and the sequence of LED patterns together form an n×n "Hadamard" matrix for a signal of length n.

Figure 6:
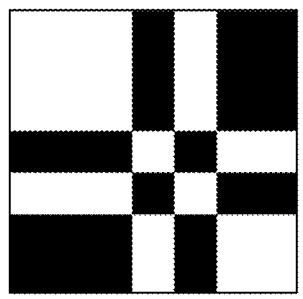
FIG. 6 is a drawing of seven 2D LED patterns, according to an embodiment.
Figure 6:
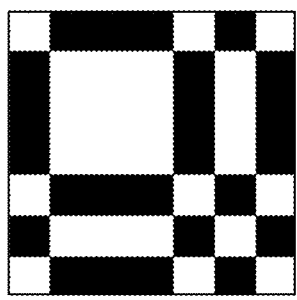
Figure 6:
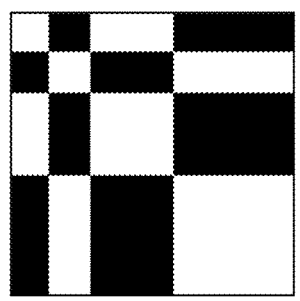
Figure 6:
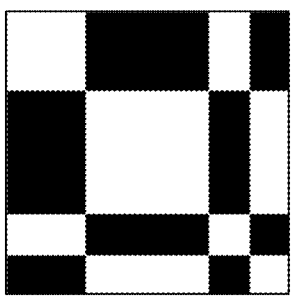
Figure 6:
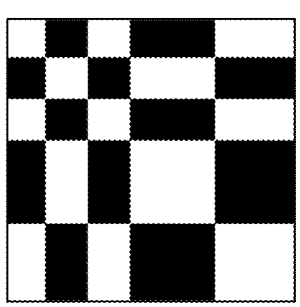
Figure 6:
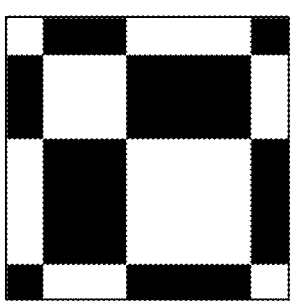
Figure 6:
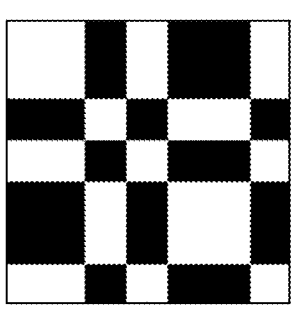

FIG. 6 is a drawing of seven 2D Hadamard LED patterns out of a sequence of 49 different 2D Hadamard patterns for a 7×7 LED array, according to an embodiment. In case, n=7 and N=n×n=49. In the drawing, a white entry denotes that the associated LED is turned on, and the black entry denotes that the LED is off.

Figure 7:
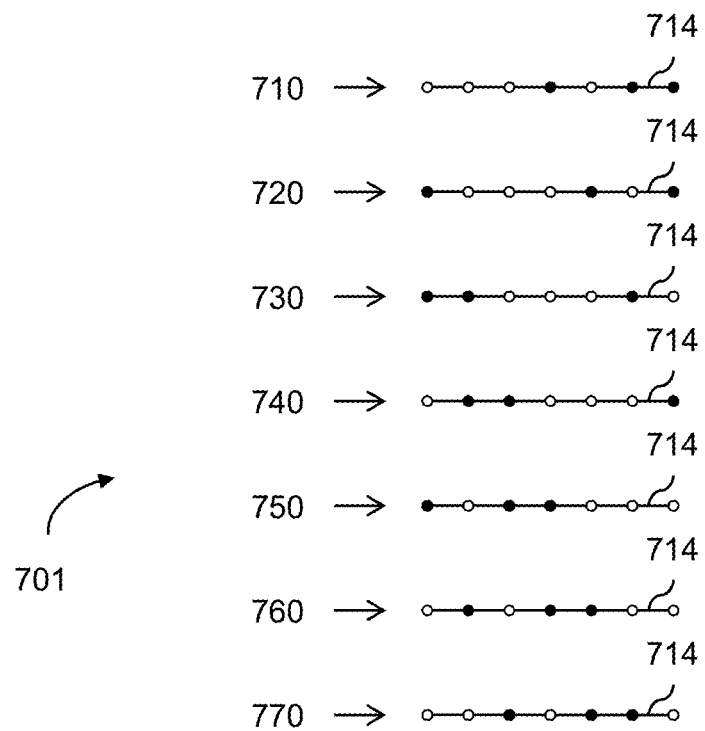
FIG. 7 is a schematic illustration of a sequence of LED patterns in a one-dimensional LED array, according to an embodiment.

FIG. 7 is a schematic illustration of a sequence of LED patterns 701 of illumination by a one-dimensional LED array 714 that can be used to acquire seven low-resolution images in a multiplexed Fourier Ptychographic imaging system, according to an embodiment. In this particular example, the LED array 714 has seven LEDs and seven illumination patterns 710, 720, 730, 740, 750, 760, 770 are used in the sequence (N=7). Although the example is shown for simplicity based on a one-dimensional LED array, extension to patterns for a two dimensional LED array are direct. One simple way of forming the associated 2D Hadamard patterns from their 1D counterparts is to first define a Hadamard pattern for the value n, or the number of LEDs that will be used along one dimension of the LED array. Then, one should set all values in the pattern vector to −1. For example, if n=7, then for the first pattern, s=[1 1 1 0 1 0 0], and thenform s'=[1 1 1 −1 1 −1 −1]. Next, one should compute the outer product of s' with itself to form $s_{2D}'=s'*s'$, where * denotes an outer-product. $s_{2D}'$ is a 7×7 matrix that contains +1's and −1's in its entries. Finally, the associated 2D pattern $s_{2D}$ is found by setting all of the entries in $s_{2D}'$ that are −1 to 0, and leaving all of the entries that are +1 unchanged.

In this example, the patterns in the sequence are Hadamard patterns based on a cyclic permutation of the vector, s=[1 1 1 0 1 0 0]. The first pattern of LEDs 710 turned on will match s (first, second, third, and fifth LED turned on). The second pattern of LEDs 720 turned on will match [0 1 1 1 0 1 0] which is shifted to the right by one. The third pattern of LEDs 730 will match [0 0 1 1 1 0 1] which is shifted from the right by one and so on. The fourth pattern of LEDs 740 will match [1 0 0 1 1 1 0] which is shifted from the right by one and so on. The fifth pattern of LEDs 750 will match [0 1 0 0 1 1 1] which is shifted from the right by one and so on. The sixth pattern of LEDs 760 will match [1 0 1 0 0 1 1] which is shifted from the right by one and so on. The seventh pattern of LEDs 770 will match [1 1 0 1 0 0 1] which is shifted from the right by one and so on. In the case of displaying a pattern on an LED array in two dimensions, the above method of shifting to the right by one may be generalized to shifting a two-dimensional pattern of LEDs sequentially to the right by one column, and down by one row. Although Hadamard patterns are used, other patterns can be used based on permutations of other s vectors. The first related example takes its patterns from the Walsh matrix, which is a re-arranged version of the Hadamard S matrix. For a second example, in some applications, it might be beneficial to select the LED patterns at somewhat at random. One example of a random sequence in the above simple example is [0 1 1 0 0 1 0], [0 0 0 1 0 1 0], [1 1 1 0 1 0 1], [1 0 1 1 1 0 0], [0 1 0 0 0 0 1], [1 0 1 1 1 1 0 0], [0 1 0 1 0 0 0 0]. In other applications, it might be beneficial to select the LED patterns as a slightly modified version of the Hadamard pattern sequence, e.g. by always leaving the middle three entries at a lower total optical power than the LEDs at the remaining locations. If we let the entries within the vector s denote the amount of optical power that is emitted from each LED, then the example sequence, $s_1$=[1 1 0.5 0 0.5 0 0] as the first pattern, $s_2$=[0 1 0.5 0.5 0 1 0] as the second pattern, $s_3$=[0 0 0.5 0.5 0.5 0 1], $s_4$=[1 0 0 0.5 0.5 1 0], $s_5$=[0 1 0 0 0.5 1 1], $s_6$=[1 0 0.5 0 0 1 1], and $s_7$=[1 1 0 0.5 0 0 1] might be beneficial.

After the multiplexed Fourier Ptyochographic imaging system captures a first image set of 7 lower resolution images I=[$I_1, I_2, \ldots, I_7$] based on the seven LED patterns shown in FIG. 7, the system can generate a second set of lower resolution images as if only one LED were turned on during each image acquisition. Here, I is a matrix that contains each detected image in one of its columns. For the case of two-dimensional images, each column of I contains the reshaped version of each two-dimensional image into a one-dimensional vector.

Figure 8:
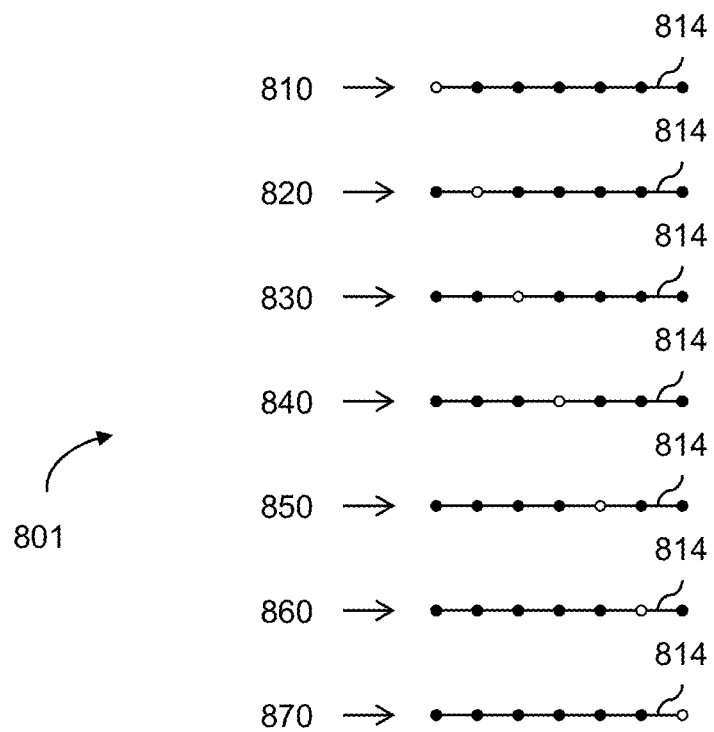
FIG. 8 is a schematic illustration of a one-dimensional LED array with seven LEDs where only one LED is turned on during each image acquisition, according to an embodiment.

FIG. 8 is a schematic illustration of illuminations 801 by a one-dimensional LED array 814 with seven LEDs where only one LED is turned on during each image acquisition, according to an embodiment. In this illustrated example, the sequence of LED patterns 801 includes illumination patterns 810, 820, 830, 840, 850, 860, 870 that sequentially illuminate a single LED in the array at each acquisition time.

After the system captures the seven images based on the seven LED patterns shown in FIG. 7, the images can be linearly combined to re-create a second set of images based on the illumination patterns shown in FIG. 8, but with lower noise (for the same exposure time). To generate the second set of lower resolution images, the multiplexed Fourier Ptyochographic imaging system performs a weighted sum operation on the first set. In one example, the system performs the weighted sum operation by first defining a combination vector, R, associated with the LED array dimensions. For example, for the one-dimensional LED array with seven LEDs, the combination vector R=[1 1 1 −1 1 −1 −1]/4. Next, the multiplexed Fourier Ptychographic imaging system determines the matrix product $L_1$=I R. $L_1$ is our desired image formed from the first LED in the LED array. $L_j$, the image formed as if just the $j^{th}$ LED were turned on, is given as a matrix product between the matrix I and the $j^{th}$ permutation of R.

The s vector of LEDs and the vector R are defined by various methods. In one example, both vectors s and R can be determined using a Hadamard code. In the LED patterns shown in FIG. 4, for example, both vectors s and R were determined using a Hadamard code for n=7. Details of the Hadamard code can be found in Schechner, Y. Y., Nayar, S. K., and Belhumeur, P. N. "Multiplexing for optimal lighting," IEEE PAMI 27, 1339-1356 (2007), which is hereby incorporated by reference for the Hadamard code. In the presence of non-additive noise, other methods may be preferred over the Hadamard code. Other sets of LEDs (i.e., random combinations) may also be a good candidate. An example of multiplexed illumination can be found in Tian, L., Li, X., Ramchandran, K., Waller, L., "Multiplexed coded illumination for Fourier ptychography with an LED microscope," Biomedical Optics Express 5(7), pp. 2376-2389 (2014), which is hereby incorporated by reference for this example. Another example may be to use random illumination sequences, in which case approximately N/2 of the LEDs within the array are turned on for each image, but these N/2 LEDs are selected uniformly at random. Finally, it may be beneficial to turn on some LEDs in the array more brightly than other LEDs within the array during the multiplexing. If we let the entries within the vector s denote the amount of optical power that is emitted from each LED, then it might be beneficial in some implementations to weight the optical power emitted from the center LEDs as less than the optical power emitted from the LEDs at the edges. In which case, the example sequence $s_1$=[1 1 0.5 0 0.5 0 0] as the first pattern, $s_2$=[0 1 0.5 0.5 0 1 0] as the second pattern, $s_3$=[0 0 0.5 0.5 0.5 0 1], $s_4$=[1 0 0 0.5 0.5 1 0], $s_5$=[0 1 0 0 0.5 1 1], $s_6$=[1 0 0.5 0 0 1 1], and $s_7$=[1 1 0 0.5 0 0 1]. Here, the center 3 LEDs remain at an optical power less than the LEDs at the side.

In many aspects, each LED pattern in a sequence of LED patterns includes a number of LEDs equal to at least half the total number of LEDs in the LED array. In one example, the number of LEDs in an LED pattern is half the total number of LEDs in the LED array. In another example the number of LEDs in an LED pattern is more than half the total number of LEDs in the LED array. In another example, the number of LEDs in an LED pattern is more than 55% of the total number of LEDs in the LED array. In another example, the number of LEDs in an LED pattern is more than 60% of the total number of LEDs in the LED array. In another example the number of LEDs in each LED pattern of a sequence of LED patterns is at least half the total number of LEDs in the LED array. In another example, the number of LEDs in each LED pattern of a sequence of LED patterns is in the range of 50% to 70% of the total number of LEDs in the LED array.

Generally each LED pattern in the sequence of LED patterns is a unique formation of illuminated LEDs. During image acquisition, each LED pattern is illuminated during the exposure time while the light detector receives photons to acquire a lower resolution image. The LED patterns can be based on certain permutations of a vector(s). In other cases the LED patterns may be random combinations of LEDs. In this case, the LED patterns may be based on a random number generation output, for example.

B. Tunable Processing Time and/or SNR

In certain aspects, a Multiplexed Fourier ptychographic imaging system can be tuned to operate with a lower than specified processing time and/or a higher than specified minimum SNR. In some cases, the system is tuned based on tuning input of a maximum processing time and/or a minimum SNR level received from, for example, an operator of the multiplexed Fourier Ptychographic imaging system. Although typically an operator refers to one or more persons, an operator could also be a program receiving high resolution data and providing tuning input. In one case, the tuning input is entered by an operator through an interface such as, for example, the external interface. Generally, the processing time refers to the duration of time for acquiring the lower resolution images during a cycle.

To determine the LED patterns, the system may first determine the number of LEDs that are needed in the LED patterns to generate at least the minimum SNR. For example, the processor may determine the number of LEDs to use in each LED pattern based on the minimum SNR value for a fixed exposure time. As discussed above, when using a square LED array, the SNR of an image will be improved by a factor of sqrt(N)/2 when illuminating N LEDs in a square LED array. Using a known SNR value for illumination by a single LED ($SNR_0$) in the array, the processor can determine the number of LEDs to use in each pattern as: $SNR_0$/sqrt(N)/2. The processor may then determine the exposure time based on: (processing time)/(N number of images acquired). Once the number of LEDs are selected, the LED patterns may be selected based on various techniques. In one example, the LED patterns may be randomly generated unique patterns. In another example, the patterns may be based on permutations of various vectors. In one case, the LED patterns may be based on permutations of Hadamard code.

Modifications, additions, or omissions may be made to Multiplexed Fourier ptychographic imaging systems without departing from the scope of the disclosure. In addition, the components of the Multiplexed Fourier ptychographic imaging systems may be integrated or separated.

II. Multiplexed Fourier Ptychographic Imaging Method

Figure 9:
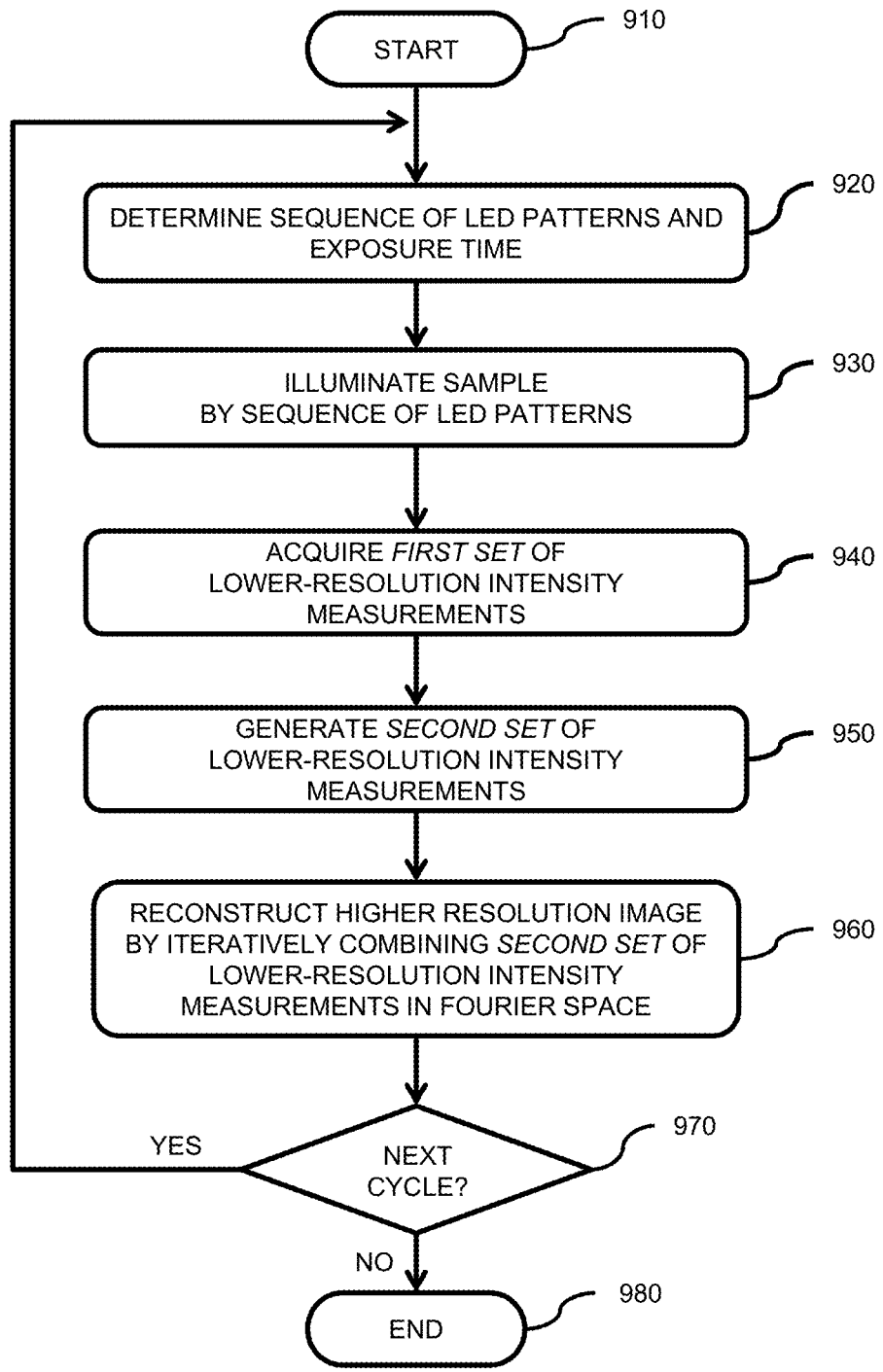
FIG. 9 is a flowchart of a Multiplexed Fourier ptychographic imaging method, according to embodiments.

FIG. 9 is a flowchart of a Multiplexed Fourier ptychographic imaging method, according to embodiments. At 910, the Multiplexed Fourier ptychographic imaging method starts its first cycle. The number of lower resolution images, N, acquired during each cycle is equal to the number of illuminating LEDs in the array. In the description of this method, a square array is used and the number of illuminating LEDs is: N=n×n.

At operation 920, a sequence of LED patterns and exposure time are determined for use in one or more operations of the cycle. In one example, the same sequence and/or exposure time are used from a prior cycle.

In some aspects, the processor may determine the number of LEDs in the patterns to use in the cycle. In one aspect, each LED pattern has up to half of the LEDs in the array. In another aspect, each LED pattern has up to a quarter of the LEDs in the array. In yet another aspect, the processor may determine the number of LEDs to use in each LED pattern based on a particular SNR value for a fixed exposure time. That is when using a square LED array, the SNR of an image will be improved by a factor of sqrt(N)/2 when illuminating N LEDs in a square LED array. Using a known SNR value for illumination by a single LED ($SNR_0$), the processor can determine the number of LEDs to use in each pattern as: $SNR_0$/sqrt(N)/2.

In some aspects, the process may then determine an exposure time to use based on a maximum processing time and a fixed SNR. The processor may determine the exposure time based on: (processing time)/(N number of images acquired).

In some cases, the particular values of the processing time and/or SNR may be a provided as tunable input from an operator or other entity. For example, the value of the processing time may be a maximum processing time entered by the operator and/or the value of the SNR may be a minimum SNR entered by the operator.

Once the number of LEDs are selected, the LED patterns may be selected based on various techniques. In one example, the LED patterns may be randomly generated unique patterns. In another example, the patterns may be based on permutations of various vectors. In one case, the LED patterns may be based on permutations of Hadamard code.

Once the sequence of LED patterns and exposure time are determined at 920, the method illuminates the sample of interest by the sequence of LED patterns at 930. The processor sends control signals to both the light detector and the LED array to synchronize the image acquisition with illumination by the LED patterns. During this image acquisition process, a first set of N lower resolution intensity measurements $I=[I_1, I_2, \ldots, I_N]$ is acquired at the light detector (940). Any of the image collection assemblies described with respect to FIGS. 1-3 can be used to sample the first set of low-resolution images.

At 950, the method generates a second set of lower resolution intensity measurements. The second set of images is analogous to what is captured when a single LED is on at each acquisition time. To generate the second set, a weighted sum operation is performed on the first set. In one example, the system performs the weighted sum operation by first defining a vector, $R_i$, associated with the LED array dimensions. Next, the multiplexed Fourier Ptychographic imaging system determines the matrix product $L_i=IR_i$. $L_1$ is our desired image formed from the first LED in the LED array. $L_j$, the image formed as if just the $j^{th}$ LED were turned on, is given as a matrix between the image matrix I, containing each detected image in its columns, and the $i^{th}$ cyclic permutation of R, which we label as the combination vector $R_i$. For a 2D LED array that displays a 2D pattern to form an image on a 2D detector, the weighted sum works in a similar manner, but first requires the 2D combination pattern and 2D image to be turned into vectors, by reshaping each n×n combination matrix (connected to each 2D LED pattern, just like the 1D combination vectors $R_i$ are connected to their associated 1D LED patterns $s_i$) into a 1×$n^2$ vector, and reshaping each m×m matrix (representative of the 2D image) into a 1×$m^2$ vector $I_i$. This expresses each 2D combination pattern as a 1D vector, $R_i$ just like above, and allows forming an image data matrix I, which contains each reshaped image $I_i$ in each of its columns, just like in the 1D pattern and image case.

At 960, the method reconstructs a high resolution image by iteratively combining the second set of lower resolution intensity measurements in Fourier space. Two examples of operations in the reconstruction process are discussed in detail with respect to FIG. 9 and FIG. 10 in the next Section. Although not shown, after 960, the method may have an optional display operation that provides output such as, for example, the high-resolution image to a display.

At 970, the method determines whether there is another cycle. If there is another cycle (YES), the method returns to 920. If there is not another cycle (NO), the method ends (980).

III. Reconstruction Process

Certain details of the reconstruction process can be found in Zheng, Guoan, Horstmeyer, Roarke, and Yang, Changhuei, "Wide-field, high-resolution Fourier ptychographic microscopy," Nature Photonics vol. 7, pp. 739-745 (2013) and in U.S. patent application Ser. No. 14/065,280, titled "Fourier Ptychographic Imaging Systems, Devices, and Methods" and filed on Oct. 28, 2013. During the reconstruction operation, overlapping regions in the Fourier domain are iteratively updated with lower the lower resolution intensity image data to generate a higher resolution image.

Figure 10:
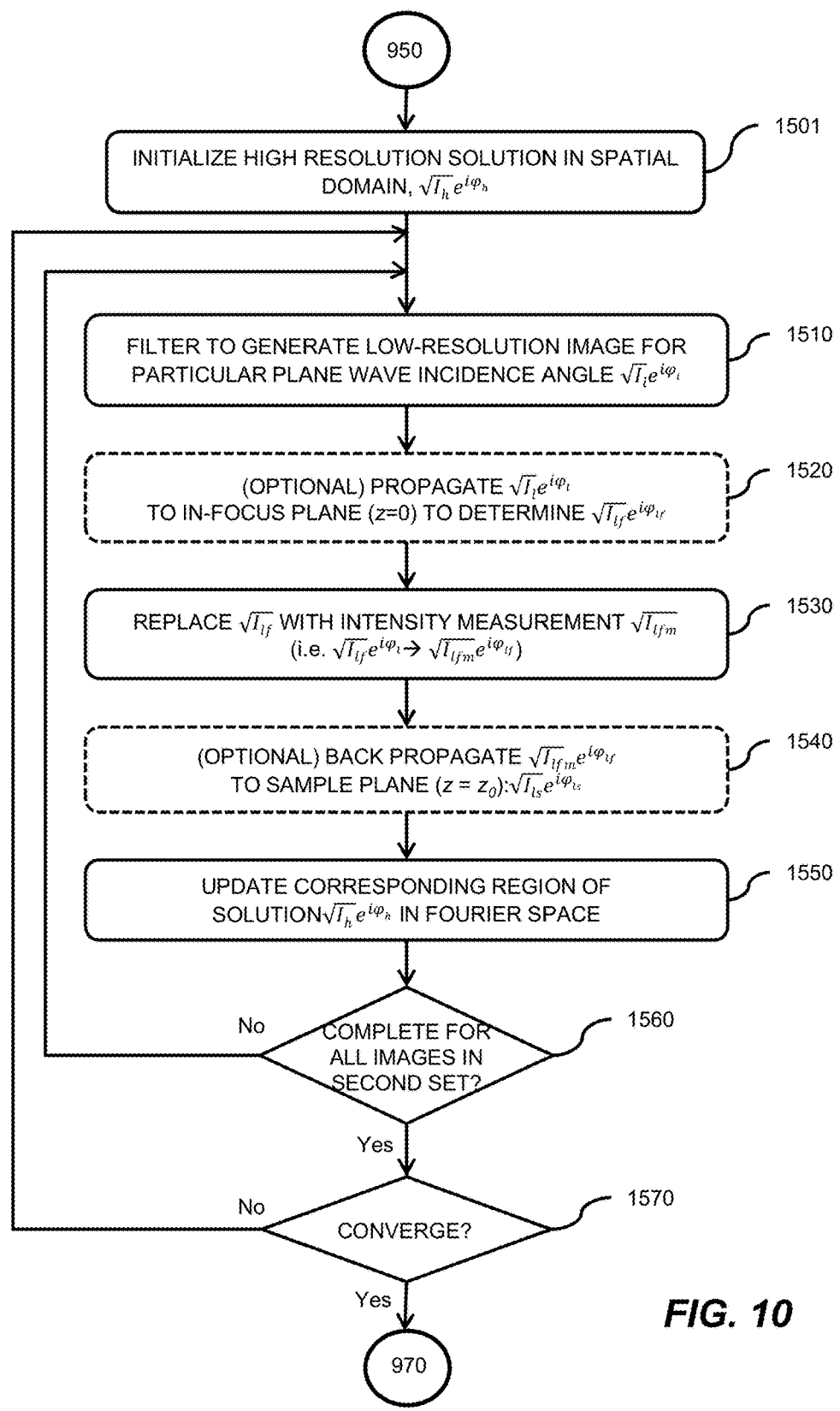
FIG. 10 is a flowchart of a reconstruction process, according to an embodiment.

FIG. 10 is a flowchart of a reconstruction process, according to an embodiment. In this process, a high-resolution image of the sample may be computationally reconstructed from the second set of N low-resolution intensity distribution measurements, $I_{lm}(k_x^i, k_y^i)$ (indexed by their illumination wavevector, $k_x^i, k_y^i$, with i=1, 2, ... N) generated at operation 950 in FIG. 9.

At 1501, a high-resolution image: $\sqrt{I_h}e^{i\varphi_h}$ is initialized in the spatial domain, and a Fourier transform is applied to the initial value to obtain an initialized Fourier transformed image $\tilde{I}_h$. The initialized high-resolution solution may be an initial guess. This initial guess may be determined based on the assumption that the sample is located at the out-of-focus plane $z=z_0$. In some cases, the initial guess may be determined as a random complex matrix (for both intensity and phase). In other cases, the initial guess may be determined as an interpolation of the low-resolution intensity measurement with a random phase. An example of an initial guess is $\varphi=0$ and $I_h$ interpolated from any low-resolution image of the sample area. Another example of an initial guess is a constant value. The Fourier transform of the initial guess can be a broad spectrum in the Fourier domain.

In the iterative operations of 1510, 1520, 1530, 1540, 1550, 1560, and 1570, the high-resolution image of the sample is computationally reconstructed by iteratively combining low-resolution intensity measurements in Fourier space using a processor of the Multiplexed Fourier ptychographic imaging system. Optional operations 1520 and 1540 may be performed if the sample is out-of-focus by the amount of $z_0$.

At 1510, the processor performs low-pass filtering of the high-resolution image $\sqrt{I_h}e^{i\varphi_h}$ in the Fourier domain to generate a low-resolution image $\sqrt{I_l}e^{i\varphi_l}$ for a particular plane wave incidence angle $(\theta_x^i, \theta_y^i)$ with a wave vector $(k_x^i, k_y^i)$. The Fourier transform of the high-resolution image is $\tilde{I}_h$ and the Fourier transform of the low-resolution image for a particular plane wave incidence angle is $\tilde{I}_l$. In the Fourier domain, the reconstruction process filters a low-pass region from the spectrum $\tilde{I}_h$ of the high-resolution image $\sqrt{I_h}e^{i\varphi_h}$. In cases with an optical element in the form of an objective lens, this region is a circular aperture with a radius of $NA*k_0$, where $k_0$ equals $2\pi/\lambda$ (the wave number in vacuum), given by the coherent transfer function of an objective lens. In Fourier space, the location of the region corresponds to the incidence angle. For an oblique plane wave incidence with a wave vector $(k_x^i, k_y^i)$, the region is centered about a position $(-k_x^i, -k_y^i)$ in the Fourier domain of $\sqrt{I_h}e^{i\varphi_h}$.

At optional operation 1520, using the processor, the low-resolution image, $\sqrt{I_l}e^{i\varphi_l}$ is propagated in the Fourier domain to the in-focus plane at z=0 of the optical element to determine the low-resolution image at the focused position: $\sqrt{I_{lf}}e^{i\varphi_{lf}}$. In one embodiment, operation 1520 can be performed by Fourier transforming the low-resolution image $\sqrt{I_l}e^{i\varphi_l}$, multiplying by a phase factor in the Fourier domain, and inverse Fourier transforming to obtain $\sqrt{I_{lf}}e^{i\varphi_{lf}}$. In another embodiment, operation 1520 can be performed by the mathematically equivalent operation of convolving the low-resolution image $\sqrt{I_l}e^{i\varphi_l}$ with the point-spread-function for the defocus. In another embodiment, operation 1520 can be performed as an optional sub-operation of operation 1510 by multiplying by multiplying by $\tilde{I}_l$ a phase factor in the Fourier domain before performing the inverse Fourier transform to produce $\sqrt{I_{lf}}e^{i\varphi_{lf}}$. Optional operation 1520 need not be included if the sample is located at the in-focus plane (z=0) of the optical element.

At operation 1530, using the processor, the computed amplitude component $\sqrt{I_{lf}}$ of the low-resolution image at the in-focus plane, $\sqrt{I_{lf}}e^{i\varphi_{lf}}$, is replaced with the square root of the low-resolution intensity measurement $\sqrt{I_{lfm}}$ measured by the light detector of the Multiplexed Fourier ptychographic imaging system. This forms an updated low resolution target: $\sqrt{I_{lfm}}e^{i\varphi_{lf}}$.

At optional operation 1540, using the processor, the updated low-resolution image $\sqrt{I_{lfm}}e^{i\varphi_{lf}}$ may be back-propagated to the sample plane $(z=z_0)$ to determine $\sqrt{I_{ls}}e^{i\varphi_{ls}}$. Optional operation 1540 need not be included if the sample is located at the in-focus plane of the optical element, that is, where $z_0=0$. In one embodiment, operation 1540 can be performed by taking the Fourier transform of the updated low-resolution image $\sqrt{I_{lfm}}e^{i\varphi_{lf}}$ and multiplying in the Fourier space by a phase factor, and then inverse Fourier transforming it. In another embodiment, operation 1540 can be performed by convolving the updated low-resolution image $\sqrt{I_{lfm}}e^{i\varphi_{lf}}$ with the point-spread-function of the defocus. In another embodiment, operation 1540 can be performed as a sub-operation of operation 1550 by multiplying by a phase factor after performing the Fourier transform onto the updated target image.

At operation 1550, using the processor, a Fourier transform is applied to the updated target image propagated to the sample plane: $\sqrt{I_{ls}}e^{i\varphi_{ls}}$, and this data is updated in the corresponding region of high-resolution solution $\sqrt{I_h}e^{i\varphi_h}$ in the Fourier space corresponding to the corresponding to the incidence wave vector $(k_x^i, k_y^i)$.

At operation 1560, the processor determines whether operations 1510 through 1560 have been completed for all the images in the second set of images. If operations 1510 through 1560 have not been completed for all the images, operations 1510 through 1560 are repeated for the next image.

At operation 1570, the processor determines whether the high-resolution solution has converged (operation 1570). For example, the processor may determine whether the high-resolution solution may have converged to a self-consistent solution. In one case, the processor compares the previous high-resolution solution of the previous iteration or initial guess to the present high-resolution solution, and if the difference is less than a certain value, the solution may have converged to a self-consistent solution. If the processor determines that the solution has not converged, then operations 1510 through 1570 are repeated. In one embodiment, operations 1510 through 1560 are repeated once. In other embodiments, operations 1510 through 1560 are repeated twice or more. If the solution has converged, the processor transforms the converged solution in Fourier space to the spatial domain to recover a high-resolution image $\sqrt{I_h}e^{i\varphi_h}$. If the processor determines that the solution has converged at operation 1570, then the process returns to operation 970 in FIG. 9.

Figure 11:
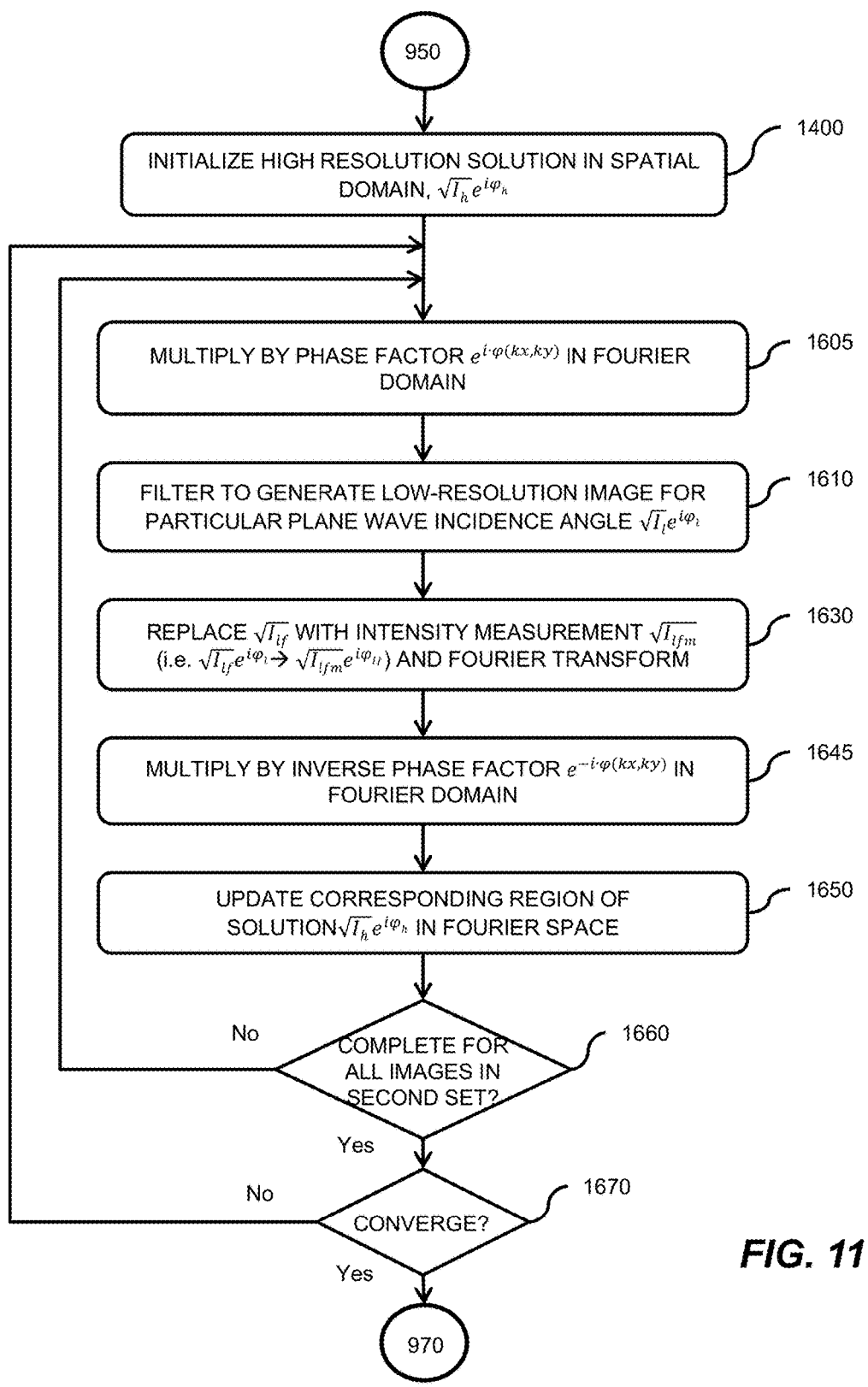
FIG. 11 is a flowchart of a reconstruction process, according to an embodiment.

FIG. 11 is a flowchart of a reconstruction process, according to an embodiment. In this process, a high-resolution image of the sample may be computationally reconstructed from the second set of N low-resolution intensity distribution measurements, $I_{lm}(k_x^i, k_y^i)$ (indexed by their illumination wavevector, $k_x^i$, $k_y^i$, with i=1, 2, . . . , N) generated at operation 950 in FIG. 9.

In this example, the process includes digital wavefront correction. The process incorporates digital wavefront compensation in the two multiplication operations 1605 and 1645. Specifically, operation 1605 models the connection between the actual sample profile and the captured intensity data (with includes aberrations) through multiplication with a pupil function: $e^{i \cdot \varphi(k_x, k_y)}$ by the processor. Operation 1645 inverts such a connection to achieve an aberration-free reconstructed image. Sample defocus is essentially equivalent to introducing a defocus phase factor to the pupil plane (i.e., a defocus aberration):

$$e^{i \cdot \varphi(k_x, k_y)} = e^{i\sqrt{(2\pi/\lambda)^2 - k_x^2 - k_y^2} \cdot z_0}, k_x^2 + k_y^2 < (NA \cdot 2\pi/\lambda)^2 \quad \text{(Eqn. 1)}$$

where $k_x$ and $k_y$ are the wavenumbers at the pupil plane, $z_0$ is the defocus distance, and NA is the numerical aperture of the optical element.

At 1601, a high-resolution image: $\sqrt{I_h}e^{i\varphi_h}$ is initialized in the spatial domain, and a Fourier transform is applied to the initial value to obtain an initialized Fourier transformed image $\tilde{I}_h$. The initialized high-resolution solution may be an initial guess. This initial guess may be determined based on the assumption that the sample is located at the out-of-focus plane $z=z_0$. In some cases, the initial guess may be determined as a random complex matrix (for both intensity and phase). In other cases, the initial guess may be determined as an interpolation of the low-resolution intensity measurement with a random phase. An example of an initial guess is $\varphi=0$ and $I_h$ interpolated from any low-resolution image of the sample area. Another example of an initial guess is a constant value. The Fourier transform of the initial guess can be a broad spectrum in the Fourier domain.

In the iterative operations of 1605, 1610, 1630, 1645, 1650, 1660, and 1670, the high-resolution image of the sample is computationally reconstructed by iteratively combining low-resolution intensity measurements in Fourier space using a processor of the Multiplexed Fourier ptychographic imaging system.

At operation 1605, the processor multiplies by a phase factor $e^{i \cdot \varphi(k_x, k_y)}$ in Fourier domain.

At operation 1610, the processor performs low-pass filtering of the high-resolution image $\sqrt{I_h}e^{i\varphi_h}$ in the Fourier domain to generate a low-resolution image $\sqrt{I_l}e^{i\varphi_l}$ for a particular plane wave incidence angle $(\theta_x^i, \theta_y^i)$ with a wave vector $(k_x^i, k_y^i)$. The Fourier transform of the high-resolution image is $\tilde{I}_h$ and the Fourier transform of the low-resolution image for a particular plane wave incidence angle is $\tilde{I}_l$. In the Fourier domain, the process filters a low-pass region from the spectrum $\tilde{I}_h$ of the high-resolution image $\sqrt{I_h}e^{i\varphi_h}$. In cases with an optical element in the form of an objective lens, this region is a circular aperture with a radius of NA*$k_0$, where $k_0$ equals $2\pi/\lambda$ (the wave number in vacuum), given by the coherent transfer function of an objective lens. In Fourier space, the location of the region corresponds to the incidence angle. For an oblique plane wave incidence with a wave vector $(k_x^i, k_y^i)$, the region is centered about a position $(-k_x^i, -k_y^i)$ in the Fourier domain of $\sqrt{I_h}e^{i\varphi_h}$.

At operation 1630, using the processor, the computed amplitude component $\sqrt{I_{lf}}$ of the low-resolution image at the in-focus plane, $\sqrt{I_{lf}}e^{i\varphi_{lf}}$, is replaced with the square root of the low-resolution intensity measurement $\sqrt{I_{lfm}}$ measured by the light detector of the Multiplexed Fourier ptychographic imaging system. This forms an updated low resolution target: $\sqrt{I_{lfm}}e^{i\varphi_{lf}}$.

At operation 1645, the processor multiplies by an inverse phase factor $e^{-i \cdot \varphi(k_x, k_y)}$ in Fourier domain.

At operation 1650, using the processor, a Fourier transform is applied to the updated target image propagated to the sample plane: $\sqrt{I_{ls}}e^{i\varphi_{ls}}$, and this data is updated in the corresponding region of high-resolution solution $\sqrt{I_h}e^{i\varphi_h}$ in the Fourier space corresponding to the corresponding to the incidence wave vector $(k_x^i, k_y^i)$.

At operation 1660, the processor determines whether operations 1605 through 1650 have been completed for all images in the second set. If operations 1605 through 1650 have not been completed for all images, operations 1605 through 1650 are repeated for the next image in the second set of images.

At operation 1670, the processor determines whether the high-resolution solution has converged. For example, the processor may determine whether the high-resolution solution may have converged to a self-consistent solution. In one case, the processor compares the previous high-resolution solution of the previous iteration or initial guess to the present high-resolution solution, and if the difference is less than a certain value, the solution may have converged to a self-consistent solution. If processor determines that the solution has not converged, then operations 1605 through 1670 are repeated. In one embodiment, operations 1605 through 1670 are repeated once. In other embodiments, operations 1605 through 1670 are repeated twice or more. If the solution has converged, the processor transforms the converged solution in Fourier space to the spatial domain to recover a high-resolution image $\sqrt{I_h}e^{i\varphi_h}$. If the processor determines that the solution has converged at operation 1670, then the process returns to operation 970 in FIG. 9.

In certain aspects, the neighboring regions in Fourier space, which are iteratively updated for each image in the second set, overlap each other. In the overlapping area between updated overlapping regions, the Multiplexed Fourier ptychographic imaging system has multiple samplings over the same Fourier space. In one embodiment, the overlapping area between neighboring regions may have an area that is between 2% to 99.5% of the area of one of the neighboring regions. In another embodiment, the overlapping area between neighboring regions may have an area that is between 65% to 75% of the area of one of the neighboring regions. In another embodiment, the overlapping area between neighboring regions may have an area that is about 65% of the area of one of the neighboring regions.

IV. Subsystems

Figure 12:
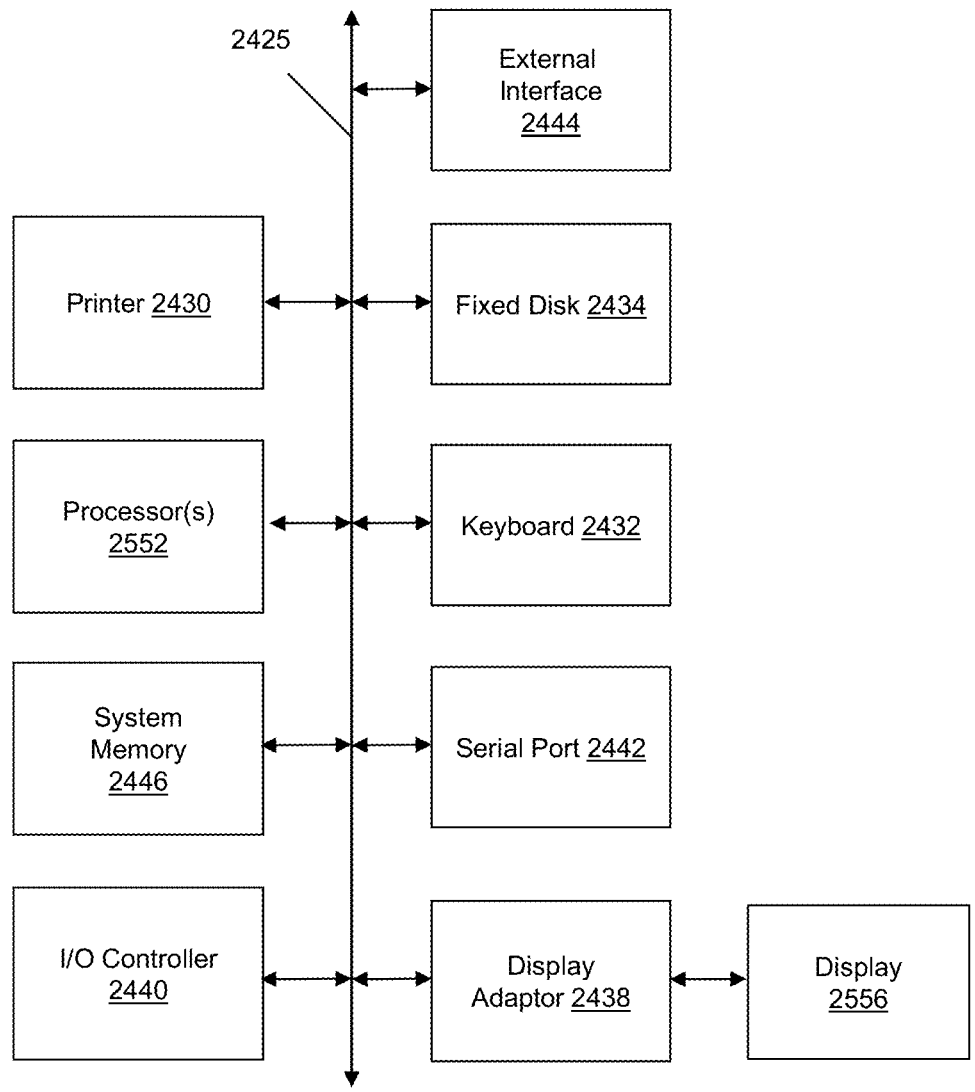
FIG. 12 is a block diagram of one or more subsystems that may be present in certain Multiplexed Fourier ptychographic imaging systems, according to embodiments.

FIG. 12 is a block diagram of one or more subsystems that may be present in certain Multiplexed Fourier ptychographic imaging systems, according to embodiments.

The various components previously described in the Figures may operate using one or more of the subsystems in FIG. 12 to facilitate the functions described herein. Any of the components in the Figures may use any suitable number of subsystems to facilitate the functions described herein. Examples of such subsystems and/or components are shown in a FIG. 12. The subsystems shown in FIG. 12 are interconnected via a system bus 2425. Additional subsystems such as a printer 2430, keyboard 2432, fixed disk 2434 (or other memory comprising computer readable media), display 2556, which is coupled to display adapter 2438, and others are shown. Peripherals and input/output (I/O) devices, which couple to I/O controller 2440, can be connected by any number of means known in the art, such as serial port 2442. For example, serial port 2442 or external interface 2444 can be used to connect components of a computing device to a wide area network such as the Internet, a mouse input device, or a scanner. The interconnection via system bus 2425 allows the processor 2552 to communicate with each subsystem and to control the execution of instructions from system memory 2446 or the fixed disk 2434, as well as the exchange of information between subsystems. The system memory 2446 and/or the fixed disk 2434 may embody the CRM 146 in some cases. Any of these elements may be present in the previously described features.

In some embodiments, an output device such as the printer 2430 or display 2556 of the Multiplexed Fourier ptychographic imaging system can output various forms of data. For example, the Multiplexed Fourier ptychographic imaging system can output 2D color/monochromatic images (intensity and/or phase), data associated with these images, or other data associated with analyses performed by the Multiplexed Fourier ptychographic imaging system.

Modifications, additions, or omissions may be made to any of the above-described embodiments without departing from the scope of the disclosure. Any of the embodiments described above may include more, fewer, or other features without departing from the scope of the disclosure. Additionally, the operations of the described features may be performed in any suitable order without departing from the scope of the disclosure.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A multiplexed Fourier Ptychographic imaging system comprising:
   a light emitting diode (LED) array configured to illuminate a sequence of different LED patterns to provide multiplexed illumination, each LED pattern comprising a plurality of illuminated LEDs, the LED array located to illuminate a sample being imaged;
   LED circuitry in electrical communication with the LED array, wherein the LED circuitry is configured to independently control power to turn on multiple LEDs simultaneously in each LED pattern;
   a lens configured to collect light issuing from the illuminated sample;
   a light detector configured to receive light collected by the lens and to acquire a first set of lower resolution images associated with the sequence of LED patterns, wherein each lower resolution image of the first set is based on light issued from the illuminated sample and received during an exposure time; and
   a processor configured to execute instructions to:
   a) use the first set of lower resolution images based on multiplexed illumination to generate a second set of lower resolution images, wherein each image of the second set is associated with one LED in the LED array, and
   b) generate a higher resolution complex image of the sample using a phase-retrieval operation to recover phase data from the second set of lower resolution images by:
      (i) initializing a higher resolution solution in Fourier domain;
      (ii) low pass filtering the initial higher resolution solution to generate data in a plurality of regions of the Fourier domain;
      (iii) inverse Fourier transforming data in a region of the plurality of regions to generate image data, replacing amplitudes of the image data with the square root of intensity measurements from an image of the second set of lower resolution images associated with an LED corresponding to the region in the Fourier domain to produce updated image data, Fourier transforming the updated image data, and update data in the region of the Fourier domain with the Fourier-transformed updated image data;
      (iv) repeating operations in (iii) for each region of the plurality of the regions to determine an updated higher resolution image; and
      (v) iteratively determining one or more updated higher resolution solutions by repeating operations in (iv) until a comparison of data derived from a current updated higher resolution solution in the one or more updated higher resolution solutions and data derived from a previous higher resolution solution or the initial higher resolution solution is less than a predefined value,
   wherein the higher resolution complex image has higher resolution than the second set of lower resolution images.

2. The multiplexed Fourier Ptychographic imaging system of claim 1, wherein the processor is further configured to send control signals through the LED circuitry to the LED array to turn on multiple LEDs simultaneously in each LED pattern.

3. The multiplexed Fourier Ptychographic imaging system of claim 1, wherein the LED circuitry comprises a wire from each LED in the LED array to control logic of the processor.

4. The multiplexed Fourier Ptychographic imaging system of claim 1, wherein the processor is further configured to execute instructions for determining the sequence of LED patterns and the exposure time.

5. The multiplexed Fourier Ptychographic imaging system of claim 4, wherein the LED patterns and the exposure time are determined based on tuning input.

6. The multiplexed Fourier Ptychographic imaging system of claim 4, wherein the processor is configured to determine the LED patterns and the exposure time based on one or both of a processing time of the Fourier Ptychographic imaging system and a signal-to-noise ratio (SNR) of images acquired during operation.

7. The multiplexed Fourier Ptychographic imaging system of claim 4, wherein the processor is further configured to execute instructions for determining the sequence of LED patterns and the exposure time based on one or both of a maximum processing time and a minimum SNR.

8. The multiplexed Fourier Ptychographic imaging system of claim 1, wherein each LED pattern in the sequence is a Hadamard pattern.

9. The multiplexed Fourier Ptychographic imaging system of claim 8, wherein each LED pattern has a number of LEDs equal to more than half the total number of LEDs in the LED array.

10. An LED assembly in a multiplexed Fourier Ptychographic imaging system, the LED array assembly comprising:
an LED array configured to sequentially illuminate different LED patterns of a sequence of LED patterns to provide multiplexed illumination, the LED array located to illuminate a sample being imaged; and
LED circuitry in electrical communication with the LED array, wherein the LED circuitry is configured to independently control power to turn on multiple LEDs simultaneously in each LED pattern, and
instructions that determine the sequence of LED patterns and the exposure time based on tuning input including a processing time and a signal-to-noise ratio (SNR), wherein the processing time is for using a first set of lower resolution images captured during the multiplexed illumination to generate a second set of lower resolution images, each image of the second set associated with one LED in the LED array, and for generating a higher resolution complex image of the sample using a phase-retrieval operation to recover phase data from the second set of lower resolution images by:
(i) initializing a higher resolution solution in Fourier domain;
(ii) low pass filtering the initial higher resolution solution to generate data in a plurality of regions of the Fourier domain;
(iii) inverse Fourier transforming data in a region of the plurality of regions to generate image data, replacing amplitudes of the image data with the square root of intensity measurements from an image of the second set of lower resolution images associated with an LED corresponding to the region in the Fourier domain to produce updated image data, Fourier transforming the updated image data, and update data in the region of the Fourier domain with the Fourier-transformed updated image data; and (iv) repeating operations in (iii) for each region of the plurality of the regions to determine an updated higher resolution image; and
(v) iteratively determining one or more updated higher resolution solutions by repeating operations in (iv) until a comparison of data derived from a current updated higher resolution solution in the one or more updated higher resolution solutions and data derived from a previous higher resolution solution or the initial higher resolution solution is less than a predefined value,
wherein the higher resolution complex image has higher resolution than the second set of lower resolution images.

11. The LED array assembly of claim 10, wherein the LED array receives control signals to illuminate the sequence of LED patterns from a controller through the LED circuitry.

12. The LED array assembly of claim 11, wherein the LED circuitry comprises a wire from each LED in the LED array to control logic of a processor.

13. The LED array assembly of claim 11, wherein the control signals for illuminating the sequence of LED patterns is based on tuning input of one or both of a maximum processing time and a minimum SNR.

14. A multiplexing Fourier Ptychographic imaging method comprising:
multiplexed illuminating of a sample by a sequence of light emitting diode (LED) patterns using an LED array;
collecting light issuing from the sample using a lens;
acquiring a first set of low resolution images of the sample using a light detector receiving light collected by the lens, each low resolution image of the first set captured during an exposure time while one of the LED patterns is illuminated, wherein each low resolution image of the first set is based on light issuing from the sample;
generating a second set of low resolution images of the sample using the first set, wherein each low resolution image of the second set is associated with a single LED in the LED array patterns; and
reconstructing a high resolution complex image of the sample using a phase-retrieval operation to recover phase data from the second set of low resolution images by:
(i) initializing a higher resolution solution in Fourier domain;
(ii) low pass filtering the initial higher resolution solution to generate data in a plurality of regions;
(iii) inverse Fourier transforming data in a region of the plurality of regions to generate image data, replacing amplitudes of the image data with the square root of intensity measurements from an image of the second set of lower resolution images associated with an LED corresponding to the region in the Fourier domain to produce updated image data, Fourier transforming the updated image data, and replacing data in the region with the Fourier-transformed updated image data;
(iv) repeating operations in (iii) for each region of the plurality of the regions to determine an updated higher resolution image; and
(v) iteratively determining one or more updated higher resolution solutions by by repeating operations in (iv) until a comparison of data derived from a current updated higher resolution solution in the one or more updated higher resolution solutions and data derived from a previous higher resolution solution or the initial higher resolution solution is less than a predefined value, wherein the higher resolution complex image has higher resolution than the second set of lower resolution images.

15. The multiplexing Fourier Ptychographic imaging method of claim 14, further comprising selecting the LED patterns and the exposure time based on one or both of a processing time and a signal-to-noise ratio.

16. The multiplexing Fourier Ptychographic imaging method of claim 15, further comprising receiving tuning input that includes the processing time or is related to the processing time.

17. The multiplexing Fourier Ptychographic imaging method of claim 14, wherein multiplexed illuminating of the sample with LED patterns comprises receiving control signals at the LED array to independently turn on each LED of each of the sequence of LED patterns.

18. The multiplexing Fourier Ptychographic imaging method of claim 15, wherein selecting the LED patterns and the exposure time comprises selecting instructions for sending control signals to the LED array for illuminating the sequence of LED patterns.

* * * * *